US005682543A

United States Patent [19]

Shiomi

[11] Patent Number: 5,682,543

[45] Date of Patent: Oct. 28, 1997

[54] DICTIONARY EDITING APPARATUS

[75] Inventor: Takakazu Shiomi, Hirakata, Japan

[73] Assignee: Matsushita Electric Industrial Co. Ltd., Osaka-fu, Japan

[21] Appl. No.: 440,823

[22] Filed: May 15, 1995

[30] Foreign Application Priority Data

May 16, 1994 [JP] Japan .................................... 6-101045

[51] Int. Cl.$^{6}$ .................................................... G06F 15/00

[52] U.S. Cl. ........................................................... 395/794

[58] Field of Search .......................... 364/419.11, 419.15, 364/419.09; 395/148, 784, 752, 754, 759, 798, 794

[56] References Cited

U.S. PATENT DOCUMENTS 5,587,902 12/1996 Kugimiya ................................ 395/752

FOREIGN PATENT DOCUMENTS 63-261467 10/1988 Japan .

1195576 8/1989 Japan .

3260764 11/1991 Japan .

*Primary Examiner*—Phu K. Nguyen

*Attorney, Agent, or Firm*—Price, Gess & Ubell

[57] ABSTRACT

A dictionary editing apparatus comprises a dictionary having a lot of dictionary data registered, each of the dictionary data including a headword and corresponding information such as translation, examples of actual usage of the headword and the like; a dictionary data input operation means for receiving input of new dictionary data to be registered in the dictionary; a dictionary data register means for registering the dictionary data in the dictionary, the dictionary data being received by the dictionary data input operation means; a headword division means for dividing the headword of the dictionary data into constituting words, the dictionary data being inputted from the dictionary data input operation means; and an additional register means for additionally registering dictionary data in the dictionary, the dictionary data including a desired constituting word divided by the headword division means as a headword and the dictionary data received by the dictionary data input operation means as corresponding information.

21 Claims, 27 Drawing Sheets

Fig. 2 PRIOR ART

International Conference on Artificial Intelligence

| headwords | corresponding information |
|---|---|
| artificial | 人工の artificial intelligence 人工知能 |
| conference | 会議 |
| intelligence | 知能 |
| international | 国際的な |
| International Conference on Artificial Intelligence | 人工知能に関する国際会議 |
| on | ～の上に |

Fig. 9 at in of on to a an the

Fig. 10

| headwords | corresponding information |
| --- | --- |
| international | 国際的な |
| conference | 会議 |
| artificial | 人工の  artificial intelligence 人工知能 |
| intelligence | (newly created) |

Fig. 11

1. international
国際的な

2. conference
会議

3. artificial
人工の artificial intelligence 人工知能

4. intelligence
(newly created)

Fig. 13

| headwords | corresponding information |
| --- | --- |
| international | 国際的な<br>International Conference on Artificial Intelligence<br>人工知能に関する国際会議 |
| conference | 会議<br>International Conference on Artificial Intelligence<br>人工知能に関する国際会議 |
| intelligence | International Conference on Artificial Intelligence<br>人工知能に関する国際会議 |

Fig. 14

| headwords | corresponding information |
|---|---|
| artificial | 人工の artificial intelligence 人工知能 |
| conference | 会議<br>International Conference on Artificial Intelligence<br>人工知能に関する国際会議 |
| intelligence | International Conference on Artificial Intelligence<br>人工知能に関する国際会議 |
| international | 国際的な<br>International Conference on Artificial Intelligence<br>人工知能に関する国際会議 |
| International Conference on Artificial Intelligence | 人工知能に関する国際会議 |
| on | ～の上に |

Fig. 15

| headwords | corresponding information |
|---|---|
| artificial | 人工の artificial intelligence 人工知能 |
| conference | 会議<br>(reference) International Conference on Artificial Intelligence |
| intelligence | (reference) International Conference on Artificial Intelligence |
| international | 国際的な<br>(reference) International Conference on Artificial Intelligence |
| International Conference on Artificial Intelligence | 人工知能に関する国際会議 |
| on | ～の上に |

| headwords | corresponding information |
| --- | --- |
| artificial | 人工の artificial intelligence 人工知能 |
| conference | 会議<br>International Conference on Artificial Intelligence<br>人工知能に関する国際会議 |
| intelligence | International Conference on Artificial Intelligence<br>人工知能に関する国際会議 |
| international | 国際的な<br>International Conference on Artificial Intelligence<br>人工知能に関する国際会議 |
| International Conference on Artificial Intelligence | 人工知能に関する国際会議 |
| on | ～の上に |

International Conference on Artificial Intelligence

| headwords | corresponding information |
|---|---|
| artificial | 人工の　artificial intelligence 人工知能 |
| conference | 会議<br>International Conference on Artificial Intelligence<br>人工知能に関する国際会議 |
| intelligence | International Conference on Artificial Intelligence<br>人工知能に関する国際会議 |
| international | 国際的な<br>International Conference on Artificial Intelligence<br>人工知能に関する国際会議 |
| on | ～の上に |

Fig. 23

| headwords | corresponding information |
| --- | --- |
| international | 国際的な<br>International Conference on Artificial Intelligence<br>人工知能に関する国際会議 |
| conference | 会議<br>International Conference on Artificial Intelligence<br>人工知能に関する国際会議 |
| intelligence | International Conference on Artificial Intelligence<br>人工知能に関する国際会議 |

Fig. 24

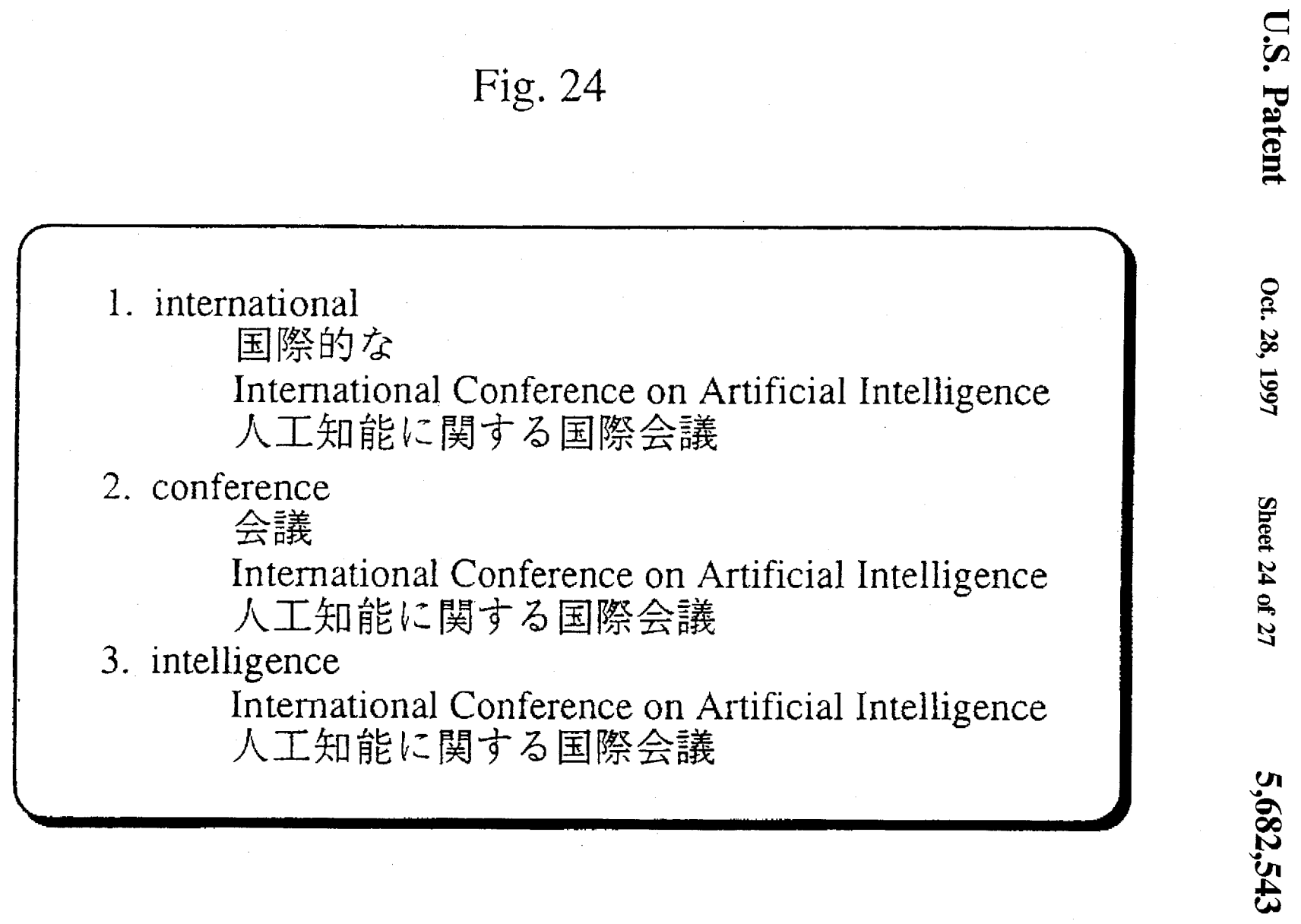

1. international
   国際的な
   International Conference on Artificial Intelligence
   人工知能に関する国際会議
2. conference
   会議
   International Conference on Artificial Intelligence
   人工知能に関する国際会議
3. intelligence
   International Conference on Artificial Intelligence
   人工知能に関する国際会議

Fig. 25

1. international
国際的な
International Conference on Artificial Intelligence
人工知能に関する国際会議

Fig. 26

| headwords | corresponding information |
| --- | --- |
| artificial | 人工の artificial intelligence 人工知能 |
| conference | 会議<br>International Conference on Artificial Intelligence<br>人工知能に関する国際会議 |
| intelligence | International Conference on Artificial Intelligence<br>人工知能に関する国際会議 |
| international | 国際的な |
| on | ～の上に |

DICTIONARY EDITING APPARATUS

(BACKGROUND OF THE INVENTION)

The present invention relates to a dictionary editing apparatus for registering dictionary data in a dictionary.

(PRIOR ART)

Most dictionaries used for machine translation apparatus are dictionary editing apparatuses, which are capable of registering new data in addition to the old one.

An example of the dictionary editing apparatus is taught in the Japanese publication 1-195576. As shown in FIG. 1, this dictionary editing apparatus comprises an input unit 101, an input/output buffer unit 102, a display unit 103, a spell check unit 104, a register unit 105, a retrieval unit 106, and a dictionary unit 107.

The dictionary unit 107 has dictionary data registered, each of the dictionary data including a headword and corresponding information. The corresponding information are translation, examples of the actual usage of the headword and the like.

The input unit 101 receives input of new dictionary data to be registered in the dictionary unit 107, and input of the headword of the dictionary data when the dictionary data registered in the dictionary unit 107 is referred to.

The input/output buffer unit 102 temporarily stores the dictionary data received by the input unit 101.

The display unit 103 displays the dictionary data in the input/output buffer unit 102.

The spell check unit 104 checks misspelled headword inputted from the input unit 101, referring to the dictionary unit 107.

The register unit 105 registers the dictionary data, which includes a correctly spelled headword, in the dictionary unit 107 as new dictionary data.

The retrieval unit 106 retrieves the dictionary data in the dictionary unit 107, using the headword received by the input unit 101 as a retrieving key word when the dictionary data in the dictionary unit 107 is referred to.

Explanation of the concrete operation of the dictionary editing apparatus follows next.

The input unit 101 receives the input of the new dictionary data to be registered in the dictionary unit 107, the new dictionary data including headword and the corresponding information as shown in FIG. 2. Then the input/output buffer unit 102 temporarily stores the new dictionary data, which is displayed by the display unit 103 next.

Then the spell check unit 104 checks misspelled headword inputted by the user, referring to the dictionary data in the dictionary unit 107. When the spell check unit 104 judges there's no misspelling in the headword shown in FIG. 2, the register unit 105 registers the dictionary data, which includes the headword and the corresponding information, in the dictionary unit 107. FIG. 3 shows an example of the dictionary data registered in the dictionary unit 107.

In order to refer to the dictionary data registered in the dictionary unit 107, the user inputs the headword of the dictionary data into the input unit 101. The retrieval unit 106 searches for the same headword in the dictionary unit 107, using the headword received by the input unit 101 as the retrieving key word. When the same headword is detected, the retrieval unit 106 reads the dictionary data to which the same headword belongs. The display unit 103 displays the dictionary data.

The dictionary data can include a headword which has a plurality of constituting words, each of which is an essential constituent of the headword. In case of referring to the dictionary data of this type in the dictionary unit 107, sometimes only a part of the constituting words is available or word order is uncertain even though all the words are available.

Supposing that the dictionary data shown in FIG. 3 are registered in the dictionary, it is impossible to obtain "人工知能に関する国際会議", which is the corresponding information of the headword "International Conference on Artificial Information", from the dictionary unit 107 by just inputting "intelligence". This is because it is impossible to retrieve the dictionary data unless exactly the same headword registered in the dictionary unit 107 is inputted.

One of the solutions is to register the dictionary data, which includes "International Conference on Artificial Intelligence" and "人工知能に関する国際会議", for each of the headword in addition to the original corresponding information. But this is very complicating, since new register process is needed for each of the headword.

Moreover, it is not easy to delete the corresponding information in the above mentioned solution.

(SUMMARY OF THE INVENTION)

It is an object of the present invention to provide a user-friendly dictionary editing apparatus capable of registering new dictionary data including a headword made of a plurality of constituting words.

Another object of the present invention is to provide a dictionary editing apparatus capable of effectively deleting dictionary data including a headword made of a plurality of constituting words.

A further object of the present invention is to provide a dictionary editing apparatus, which makes a dictionary compact and enables users to look up words quickly.

The first object may be fulfilled by a dictionary editing apparatus which shows the following seven features.

(1) The dictionary editing apparatus comprises a dictionary having a lot of dictionary data registered, each of the dictionary data including a headword and corresponding information such as translation, examples of actual usage of the headword and the like; a dictionary data input operation unit for receiving input of new dictionary data to be registered in the dictionary; a dictionary data register unit for registering the dictionary data in the dictionary, the dictionary data being received by the dictionary data input operation unit; a headword division unit for dividing the headword of the dictionary data into constituting words, the dictionary data being inputted from the dictionary data input operation unit; and an additional register unit for additionally registering dictionary data in the dictionary, the dictionary data including a desired constituting word divided by the headword division unit as a headword and the dictionary data received by the dictionary data input operation unit as corresponding information.

In the construction (1), dictionary data is additionally registered in the corresponding information of a desired constituting word which is used as a headword. So users can refer to, by just inputting the constituting word, the additionally registered dictionary data.

(2) The additional register unit may include a constituting word retrieval unit for searching for the same headword in the dictionary, using the constituting words divided by the headword division unit as retrieving key words; and a headword creation unit for creating new dictionary data, when the constituting word retrieval unit cannot detect the same headword in the dictionary using the constituting word as the retrieving key word, the new dictionary data including the constituting word as a headword and information showing that the dictionary data is newly created as corresponding information.

(3) The dictionary editing apparatus may further include a dictionary data temporary storage unit for temporarily storing the dictionary data to which the same headword detected by the constituting word retrieval unit belongs, and the new dictionary data which is created by the headword creation unit when the constituting word retrieval unit cannot detect the same headword in the dictionary using the constituting word as the retrieving key word, the new dictionary data including the constituting word as a headword and information showing that the dictionary data is newly created as corresponding information; an additional storage prohibition dictionary data storage unit having headwords about which adding new data as the corresponding information is prohibited; and a first dictionary data deletion unit for deleting, when the headword stored in the dictionary data temporary storage unit and the headword stored in the additional storage prohibition dictionary data storage unit are the same, the dictionary data and/or the new dictionary data to which the headword belongs to from the dictionary data temporary storage unit.

In the construction (2) and (3), new registration of the dictionary data in the corresponding information is prohibited for the words which are used widely for various purposes. This enables users to save trouble in referring to dictionary data.

(4) The dictionary editing apparatus may further include an additional storage prohibition dictionary data change unit for one of adding and deleting at least one headword stored in the additional storage prohibition dictionary data storage unit.

(5) The dictionary editing apparatus may further include a corresponding information addition unit for additionally storing the dictionary data as a part of the corresponding information of the headword stored in the dictionary data temporary storage unit, the dictionary data being received by the dictionary data input operation unit.

(6) The dictionary editing apparatus may further include a display unit for displaying the dictionary data temporarily stored in the dictionary data temporary storage unit; a register selection operation unit for receiving a direction to select the dictionary data to be registered in the dictionary, the dictionary data being displayed by the display unit; and a second dictionary data deletion unit for deleting the dictionary data from the dictionary data temporary storage unit, the dictionary data about which the register selection operation unit did not receive the selection direction.

In the construction (4),(5), and (6), the dictionary data is registered for headwords, except for ones which do not need the dictionary data in the corresponding information.

(7) The additional register unit may further include a headword matching judgement unit for judging whether the same headword as registered in the dictionary data temporary storage unit is registered in the dictionary; a corresponding information replacement unit for replacing the corresponding information in the dictionary data with the corresponding information stored in the dictionary data temporary storage unit, when the headword matching judgement unit judges that same headword is registered; and a dictionary data additional register unit for additionally registering the dictionary data in the dictionary, the dictionary data being stored in the dictionary data temporary storage unit, when the headword matching judgement unit judges that the same headword is not registered.

The second object may be fulfilled by a dictionary editing apparatus which shows the following three features.

(1) The dictionary editing data comprises a dictionary having dictionary data registered, each of the dictionary data including a headword and corresponding information; a deletion data input operation unit for receiving input of a headword of the dictionary data to be deleted from the dictionary data registered in the dictionary; a deletion data retrieval unit for retrieving the same headword in the dictionary, using the headword received by the deletion data input operation unit as the retrieving key word; a first dictionary data deletion unit for deleting dictionary data from the dictionary, the dictionary data to which the headword retrieved by the deletion data retrieval unit belongs; a deletion data word division unit for dividing the headword into constituting words, the headword being retrieved by the deletion data retrieval unit; a constituting word retrieval unit for retrieving the same headword in the dictionary, using the constituting words divided by the deletion data word division unit as the retrieving key words; a display unit for displaying the dictionary data retrieved by the constituting word retrieval unit; a deletion data selection unit for receiving a direction to select the dictionary data retrieved by the constituting word retrieval unit; a second dictionary data deletion unit for deleting, from the dictionary, at least part of the desired corresponding information of the dictionary data about which the deletion data Selection unit received the selection direction; wherein at least part of the desired corresponding information is the dictionary data deleted by the first dictionary data deletion unit.

(2) The dictionary editing apparatus may further include a deletion data temporary storage unit for temporary storing dictionary data to which the headword belongs to, the headword being retrieved by the constituting word retrieval unit; a deletion data deletion unit for deleting the dictionary data which does not include, in the corresponding information stored in the deletion data temporary storage unit, the same part as the dictionary data deleted from the dictionary by the first dictionary data deletion unit; wherein the display unit displays the dictionary data stored in the deletion data temporary storage unit after the dictionary data is deleted by the deletion data deletion unit; wherein the deletion data selection unit may include a selection unit for receiving a direction to select the dictionary data to be deleted from the dictionary, the dictionary data being displayed by the display unit; a temporary storage data deletion unit for deleting, from the deletion data temporary storage unit, the dictionary data about which the selection unit did not receive the selection direction; a usage deletion unit for deleting, from the corresponding information stored in the deletion data temporary storage unit, the same part as the dictionary data deleted from the dictionary by the first dictionary data deletion unit, after the dictionary data is deleted from the temporary storage data deletion unit; wherein the second dictionary data deletion unit may include the dictionary data replacement unit for replacing the corresponding information of the headword in the dictionary with the corresponding information stored in the deletion data temporary storage unit, the headword being the same as the headword stored in the deletion data temporary storage unit.

(3) The first dictionary data deletion unit may include a deletion dictionary data selection unit for receiving a direction to select one dictionary data from the dictionary data displayed by the display unit; and a first dictionary data deletion unit for deleting the dictionary data from the dictionary, the dictionary data about which the deletion dictionary data selection unit received the selection direction; wherein the display unit displays, when the deletion data retrieval unit retrieves a plurality of the same headwords in the dictionary, all dictionary data to which the same headwords in the dictionary belong to.

The third object may be fulfilled by a dictionary editing apparatus which shows the following three features.

(1) The dictionary editing apparatus may further include a deletion data input operation unit for receiving input of a headword of dictionary data to be deleted from the dictionary; a deletion data retrieval unit for searching for the same headword in the dictionary, using the headword received by the deletion data input operation unit as the retrieving key word; a first dictionary data deletion unit for deleting dictionary data from the dictionary, the dictionary data to which the headword retrieved by the deletion data retrieval unit belongs to; a deletion data word division unit for dividing the headword into constituting words, the headword being retrieved by the deletion data retrieval unit; a constituting word retrieval unit for retrieving the same headword in the dictionary, using the constituting words divided by the deletion data word division unit as retrieving key words; a deletion data selection unit for receiving a direction to select the dictionary data retrieved by the constituting word retrieval unit; a second dictionary data deletion unit for deleing, from the dictionary, at least part of the desired corresponding information of the dictionary data about which the deletion data selection unit received the selection direction; wherein at least part of the desired corresponding information is the dictionary data deleted by the first dictionary data deletion unit, and the display unit displays the dictionary data retrieved by the constituting word retrieval unit.

(2) The dictionary editing apparatus may further include a deletion data temporary storage unit for temporary storing dictionary data to which the headword belongs to, the headword being retrieved by the constituting word retrieval unit; a deletion data deletion unit for deleting the dictionary data which does not include, in the corresponding information stored in the deletion data temporary storage unit, the same part as the dictionary data deleted from the dictionary by the first dictionary data deletion unit; wherein the display unit displays the dictionary data stored in the deletion data temporary storage unit after the dictionary data is deleted by the deletion data deletion unit; wherein the deletion data selection unit may include a selection unit for receiving a direction to select the dictionary data to be deleted from the dictionary, the dictionary data being displayed by the display unit; a temporary storage data deletion unit for deleting, from the deletion data temporary storage unit, the dictionary data about which the selection unit did not receive the selection direction; a usage deletion unit for deleting, from the corresponding information stored in the deletion data temporary storage unit, the same part as the dictionary data deleted from the dictionary by the first dictionary data deletion unit, after the dictionary data is deleted from the temporary storage data deletion unit; wherein the second dictionary data deletion unit may include the dictionary data replacement unit for replacing the corresponding information of the headword in the dictionary with the corresponding information stored in the deletion data temporary storage unit, the headword being the same as the headword stored in the deletion data temporary storage unit.

(3) The first dictionary data deletion unit may include a deletion dictionary data selection unit for receiving a direction to select one dictionary data from the dictionary data displayed by the display unit; and a first dictionary data deletion unit for deleting the dictionary data from the dictionary, the dictionary data about which the deletion dictionary data selection unit received the selection direction; wherein the display unit displays, when the deletion data retrieval unit retrieves a plurality of the same headwords in the dictionary, all dictionary data to which the same headwords in the dictionary belong to.

(BRIEF DESCRIPTION OF THE DRAWING)

The object, advantages and features of the invention will become apparent from the following description thereof taken in conjunction with the accompanying drawings which illustrate a specific construction of the invention. In the drawings:

Figure 2:
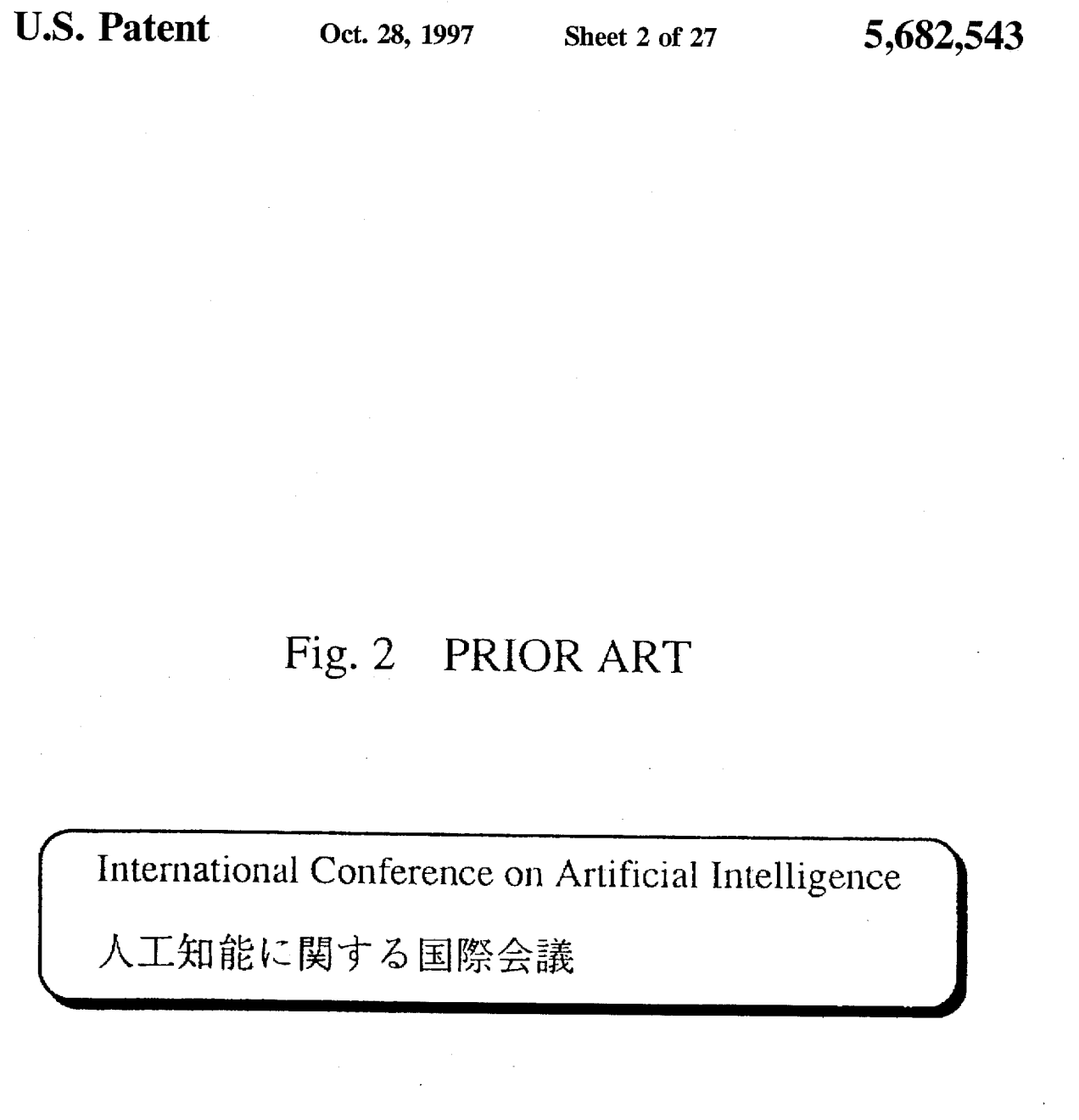

FIG. 2 is an example of dictionary data to be registered in the conventional dictionary unit.

FIG. 3 shows dictionary data registered in the conventional dictionary unit.

FIG. 9 shows dictionary data stored in an additional storage prohibition dictionary data storage unit of Embodiment 1.

FIG. 10 shows dictionary data stored in the second temporary storage unit of Embodiment 1.

FIG. 11 shows dictionary data temporarily stored in the second temporary storage unit displayed by a display unit of Embodiment 1.

FIG. 13 shows dictionary data stored in the second temporary storage unit of Embodiment 1.

FIG. 14. shows dictionary data in the dictionary of Embodiment 1.

FIG. 15 shows variation of the dictionary data stored in the dictionary of Embodiment 1.

FIG. 18 shows dictionary data registered in a dictionary of Embodiment 2.

FIG. 20 shows dictionary data in the first deletion data temporary storage unit displayed by the display unit of Embodiment 2.

FIG. 21 shows dictionary data registered in the dictionary of Embodiment 2.

FIG. 23 shows dictionary data stored in the second deletion data temporary storage unit of Embodiment 2.

FIG. 24 shows dictionary data stored in the second deletion data storage unit displayed by the display unit of Embodiment 2.

FIG. 25 shows dictionary data stored in the second deletion data temporary storage unit of Embodiment 2.

FIG. 26 shows dictionary data stored in the dictionary of Embodiment 2.

[DESCRIPTION OF THE PREFERRED EMBODIMENTS]

In the following embodiments, the dictionary editing apparatus will be described by means of diagrams.

(Embodiment 1)

Figure 1:
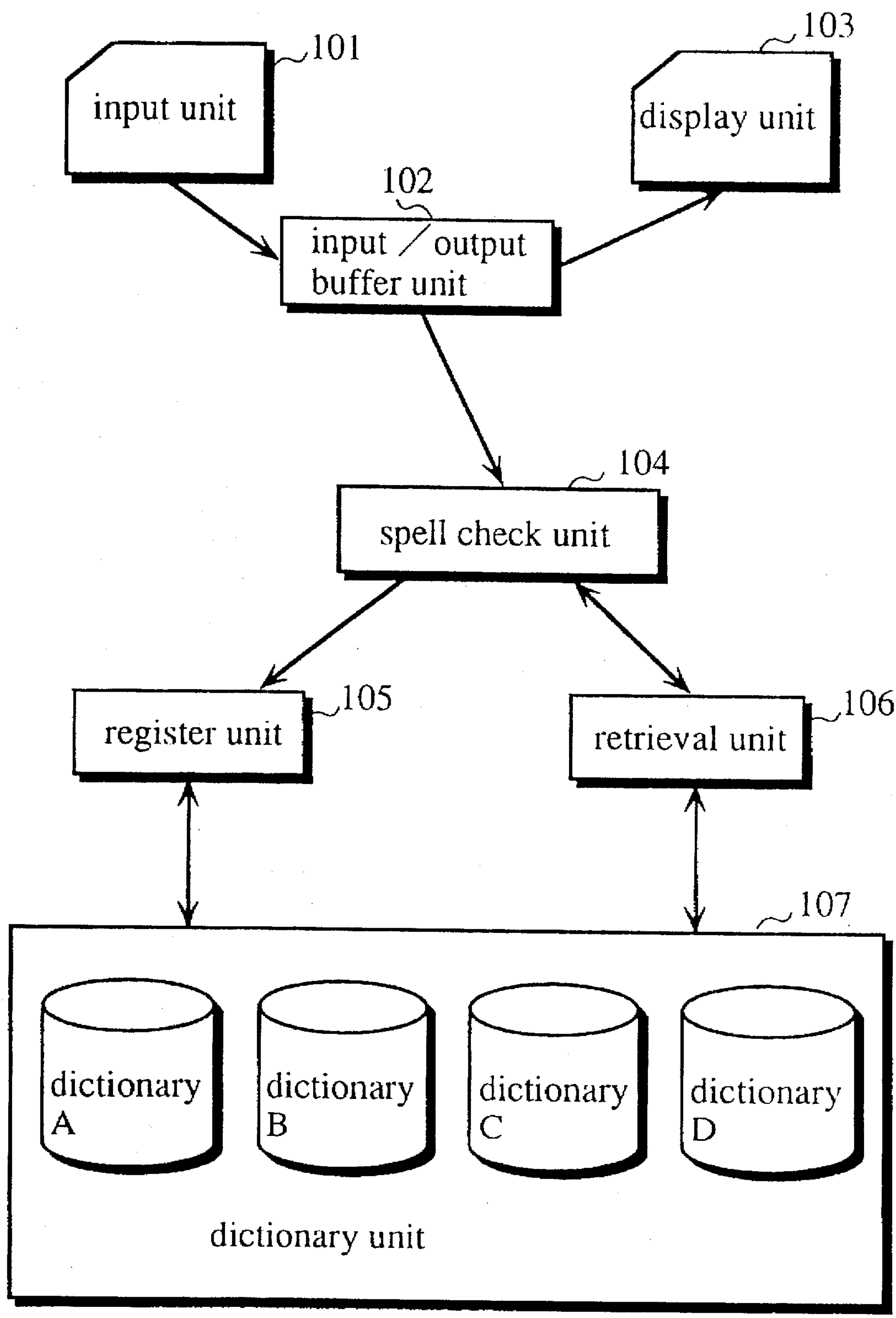
FIG. 1 is a block diagram of the conventional dictionary editing apparatus.
Figure 4:
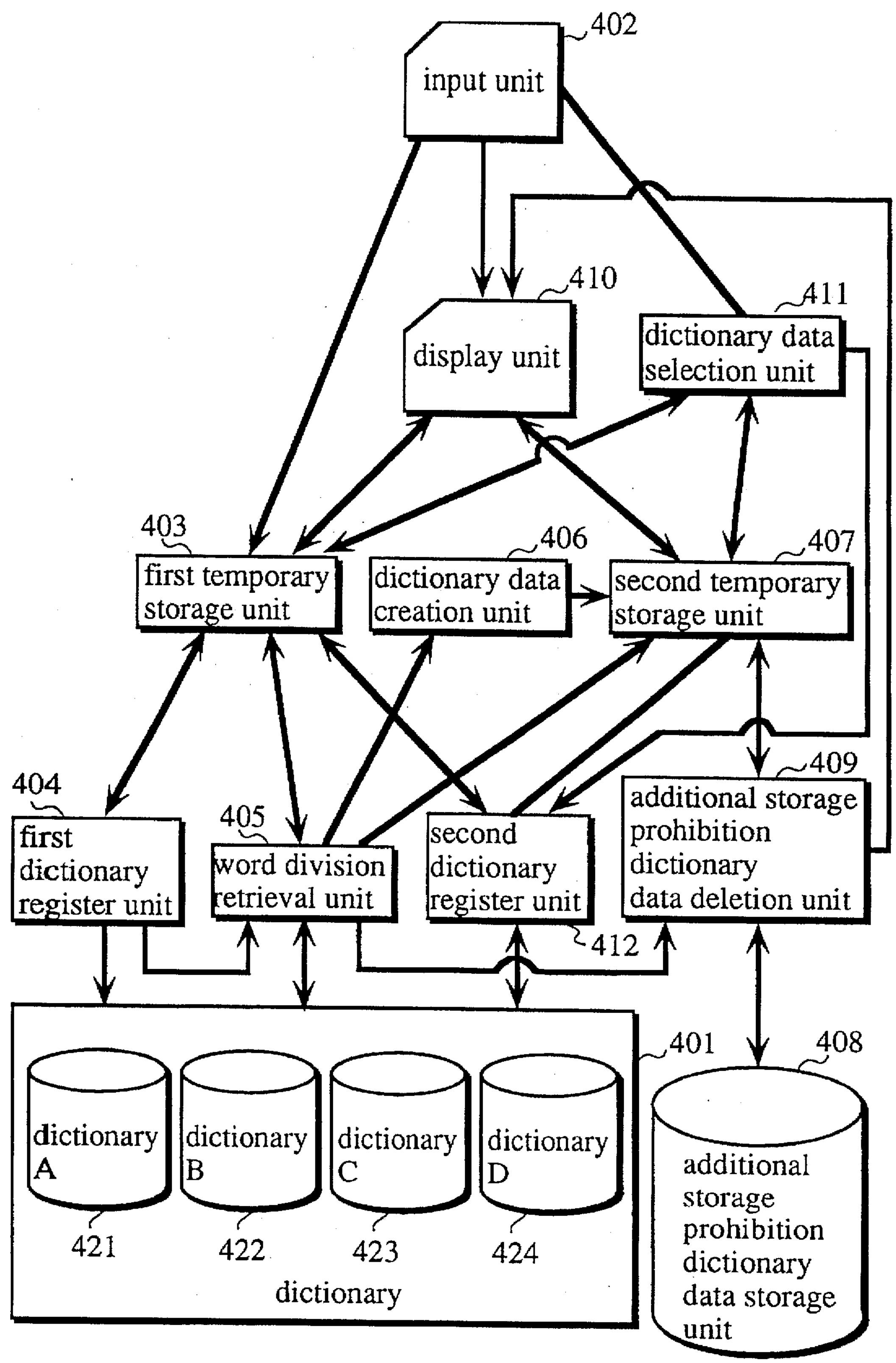
FIG. 4 is a block diagram of dictionary editing apparatus according to Embodiment 1 of the present invention.

FIG. 4 shows construction of Embodiment 1 of a dictionary editing apparatus according to the present invention.

The present dictionary editing apparatus comprises a dictionary 401 having magnetic disk and the like, an input unit 402 having key boards and the like, a first temporary storage unit 403 having a high speed semiconductor memory and the like, a first dictionary register unit 404, a word division retrieval unit 405, a dictionary data creation unit 406, a second temporary storage unit 407 having a high speed semiconductor memory and the like, an additional storage prohibition dictionary data storage unit 408 having the magnetic disk, the high speed semiconductor memory and the like, an additional storage prohibition dictionary data deletion unit 409, a display unit 410 having CRT, a printer and the like, a dictionary data selection unit 411, and a second dictionary register unit 412.

The dictionary 401 has already registered dictionary data, each of which includes a headword and corresponding information such as translation, examples of actual usage of the headword, part of speech, antonyms, synonyms of the headword, and the like. New dictionary data is registered in the dictionary 401 by the first dictionary register unit 404 or the second dictionary register unit 412. The dictionary 401 comprises a basic dictionary 421, a technical term dictionary 422, a user dictionary 423, an irregular conjugation dictionary 424 and the like.

Figure 5:
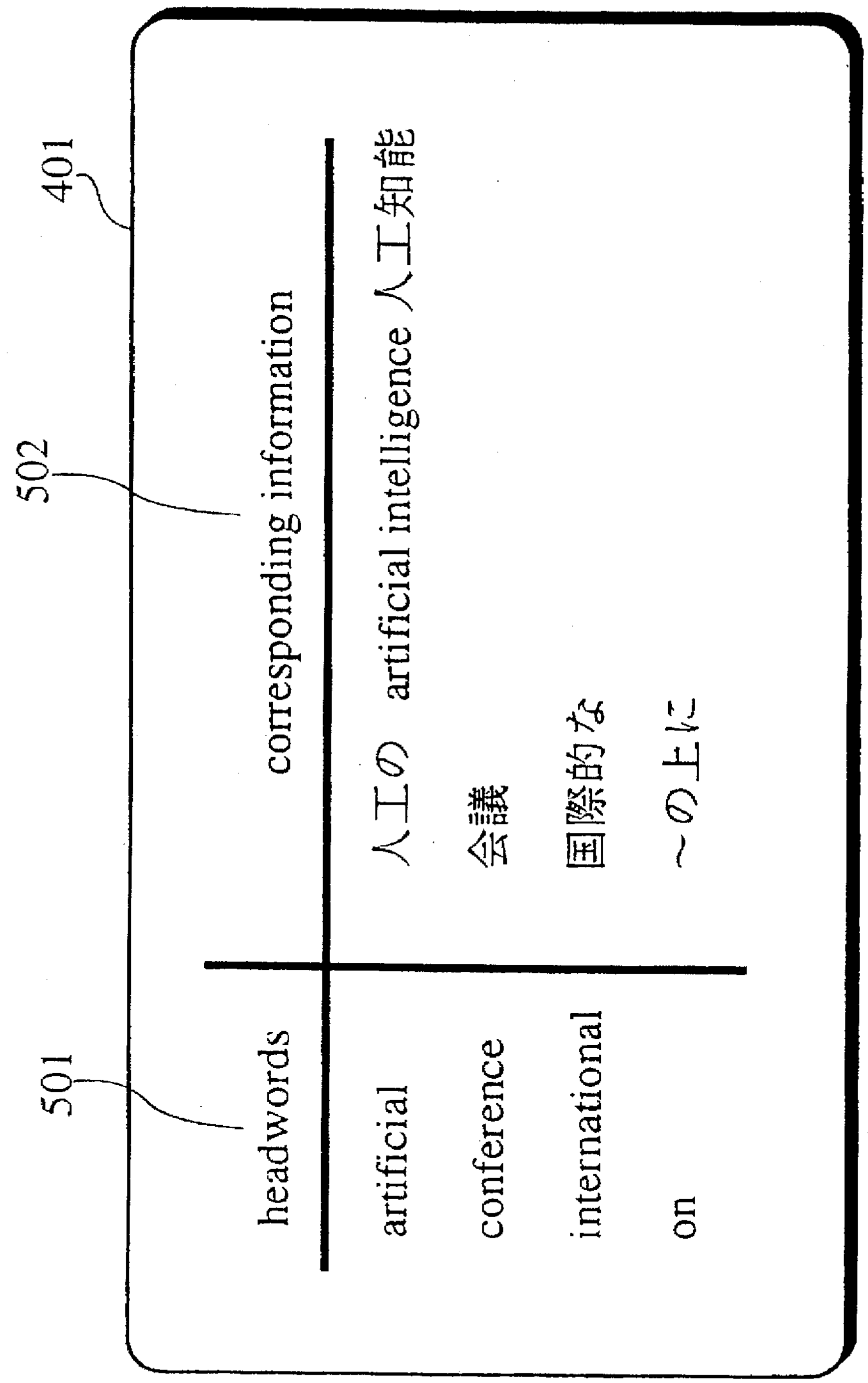
FIG. 5 shows an example of dictionary data registered in a dictionary of Embodiment 1.

FIG. 5 shows an example of the dictionary data in the dictionary 401, in which the headwords are arranged in alphabetical order. Dictionary data which are irrelevant to the present invention are omitted. The dictionary 401 is an English-Japanese dictionary in which the dictionary data are registered, the dictionary data including headwords 501 and the corresponding information 502. The corresponding information 502 are Japanese translation and the actual usage of the headwords 501.

The input unit 402 receives input of the new dictionary data to be registered, and a direction to select the dictionary data to be registered in the dictionary 401 from the user who saw the dictionary data in the second temporary storage unit 407, the dictionary data being displayed by the display unit 410. Receiving the input of the dictionary data, the input unit 402 stores the dictionary data in the first temporary storage unit 403, and starts the display unit 410 and the first dictionary register unit 404. Receiving the direction to select the dictionary data, the input unit 402 sends the message to the dictionary data selection unit 411.

The first temporary storage unit 403 temporarily stores the dictionary data received by the input unit 402. For example, when the input unit 402 receives the headword "International Conference on Artificial Intelligence" and the corresponding information "人工知能に関する国際会議", the first temporary storage unit 403 temporarily stores the headword 601 and the corresponding information 602 as shown in FIG. 6.

The first dictionary register unit 404, which is started by the input unit 401, reads the dictionary data stored in the first temporary storage unit 403, registers it in the dictionary 401, and starts the word division retrieval unit 405.

Figure 6:
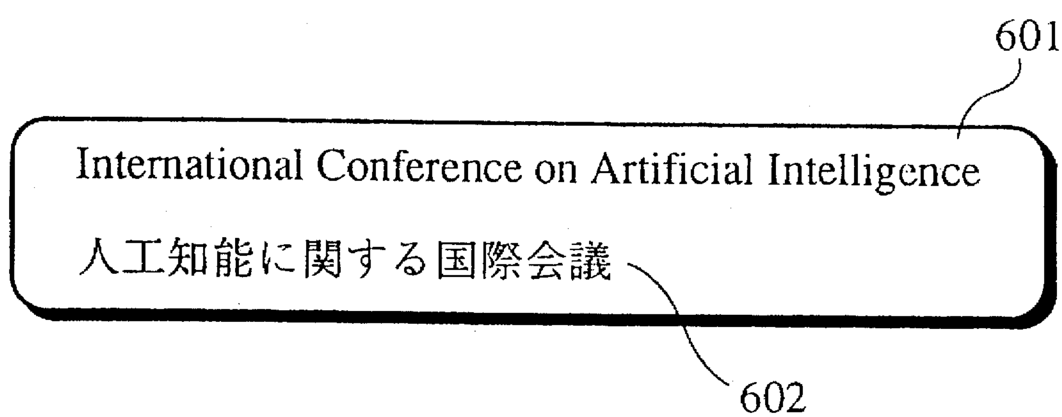
FIG. 6 shows dictionary data to be registered in the dictionary of Embodiment 1.
Figure 7:
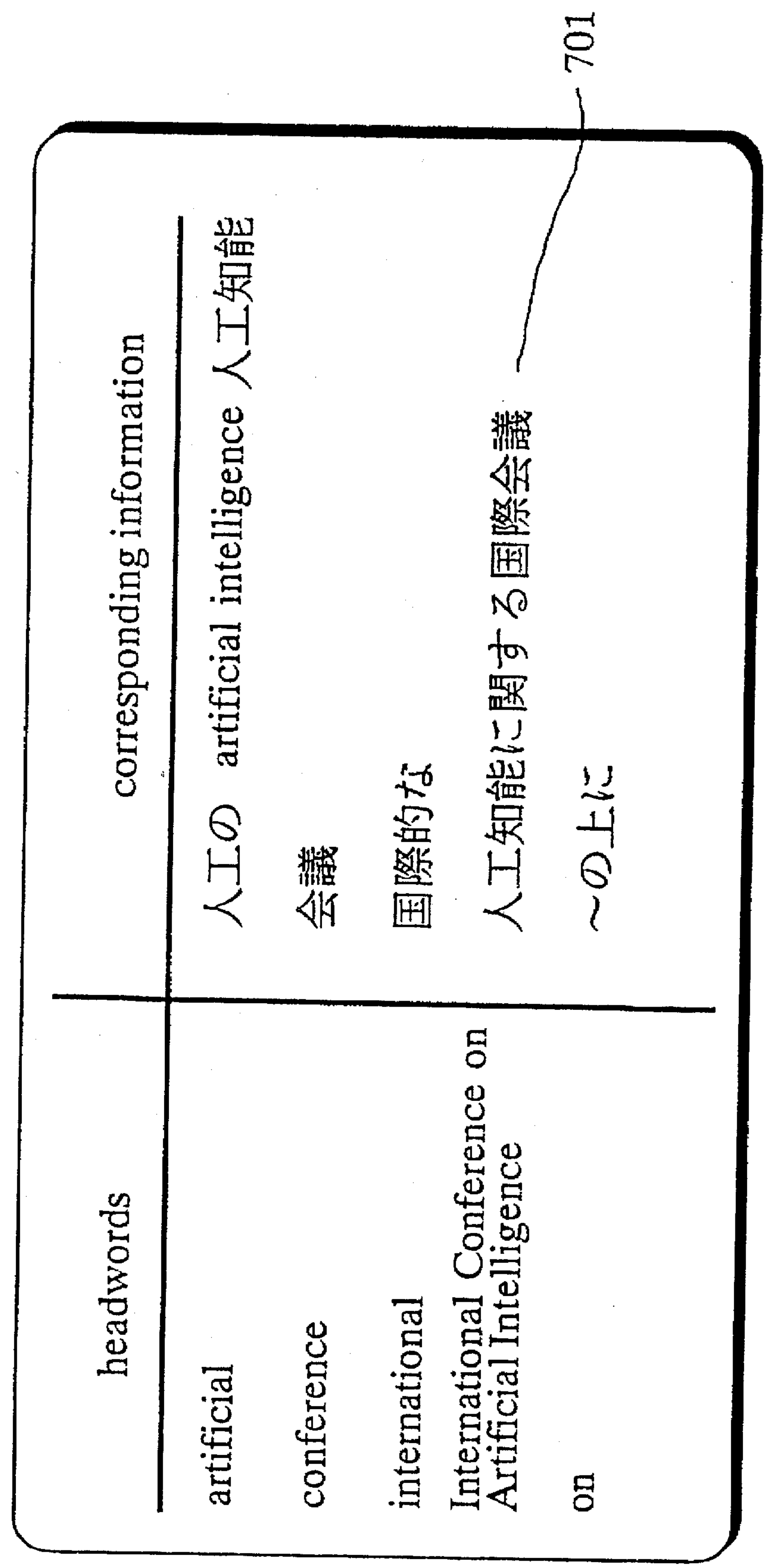
FIG. 7 shows dictionary data registered in the dictionary of Embodiment 1.

When the dictionary data shown in FIG. 6 is stored in the first temporary storage unit 403, the dictionary data in the dictionary 401 shown in FIG. 5 changes to the dictionary data shown in FIG. 7. Specifically, dictionary data 701 is registered between the dictionary data which includes the headword "international" and the dictionary data which includes the headword "on".

The word division retrieval unit 405, which is started by the first dictionary register unit 404, reads the headword stored in the first temporary storage unit 403 and divides them into constituting words. Since English language is used in the present embodiment, space between words is used for the division. And in the dictionary 401, an irregular declension dictionary 424 is especially referred to.

If the language being used is the type which cannot be written in a sentence having space between words, such as Chinese and Japanese, a morpheme analysis, method of selecting the longest word from the dictionary and the like are used for the division. At this point, morpheme analysis dictionary and the like in the dictionary 401 are used.

When the headword is divided into constituting words, that is, the headword is made of a plurality of constituting words, the word division retrieval unit 405 reads the constituting words from the top, the constituting words being stored in the first temporary storage unit 403. Then the word division retrieval unit 405 searches for the same headword in the dictionary 401, using the constituting words as retrieving key words. When the same constituting word is detected, the word division retrieval unit 405 reads the dictionary data to which the headword belongs, and stores the dictionary data in the second temporary storage unit 407. When the same headword is not detected, the word division retrieval unit 405 sends the retrieving key words to the dictionary data creation unit 406.

When the word division retrieval unit 405 finishes searching for the same constituting word in the dictionary 401, it starts the additional storage prohibition dictionary data deletion unit 409.

Specifically, when the headword 601 shown in FIG. 6 is stored in the first temporary storage unit 403, the word division retrieval unit 405 divides the headword 601 into the 5 constituting words, "international", "conference", "on", "artificial", and "intelligence". Then the word division retrieval unit 405 searches for the same headword in the dictionary 401 using each of the constituting words successively from the top as retrieving key words. When the same constituting word is detected, the word division retrieval unit 405 reads the dictionary data to which the headword belongs, and stores it in the second temporary storage unit 407. On the other hand, when the same headwords are not detected by using retrieving key word "intelligence" as shown in FIG. 5, the word division retrieval unit 405 sends "intelligence" to the dictionary data creation unit 406.

The dictionary data creation unit 406, which receives the retrieving key word from the word division retrieval unit 405, creates dictionary data which includes the retrieving key word as a headword, and stores it in the second temporarily storage unit 407. At this point, in order to clarify that this is a newly created dictionary data, "newly created" is stored as the corresponding information for the headword.

The second temporary storage unit 407 temporarily stores the dictionary data read from the dictionary 401 by the word division retrieval unit 405, and the dictionary data newly created by the dictionary data creation unit 406.

Figure 8:
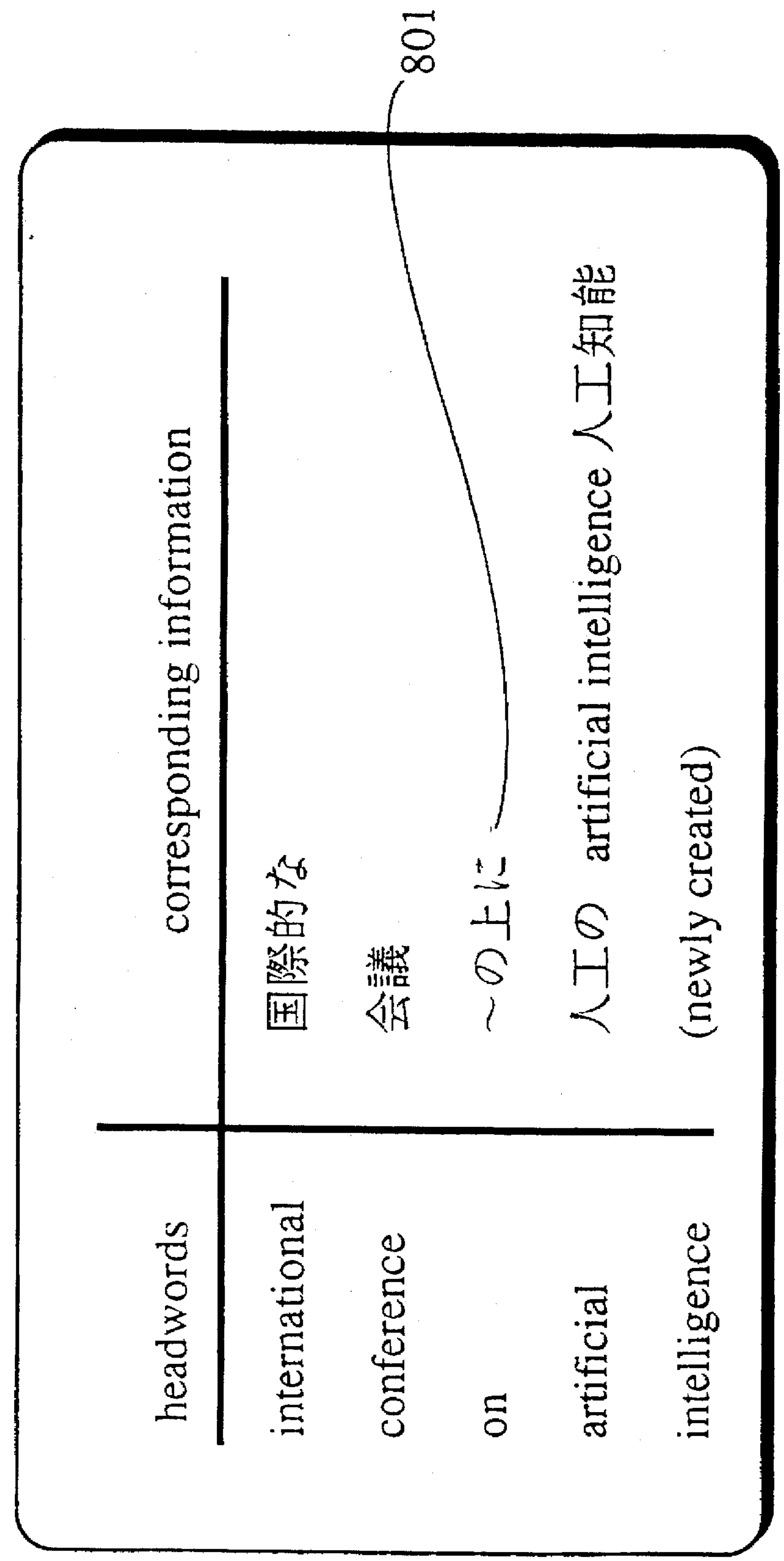
FIG. 8 shows dictionary data stored in a second temporary storage unit of Embodiment 1.

FIG. 8 shows the new dictionary data in the second temporary storage unit 407. The dictionary data can be deleted and/or added by the additional storage prohibition dictionary data deletion unit 409 and/or the dictionary data selection unit 411.

The additional storage prohibition dictionary data storage unit 408 stores the headword of which users do not need to change the corresponding information in the dictionary data stored in the dictionary 401. Examples of the headwords are shown in FIG. 9.

Figure 9:
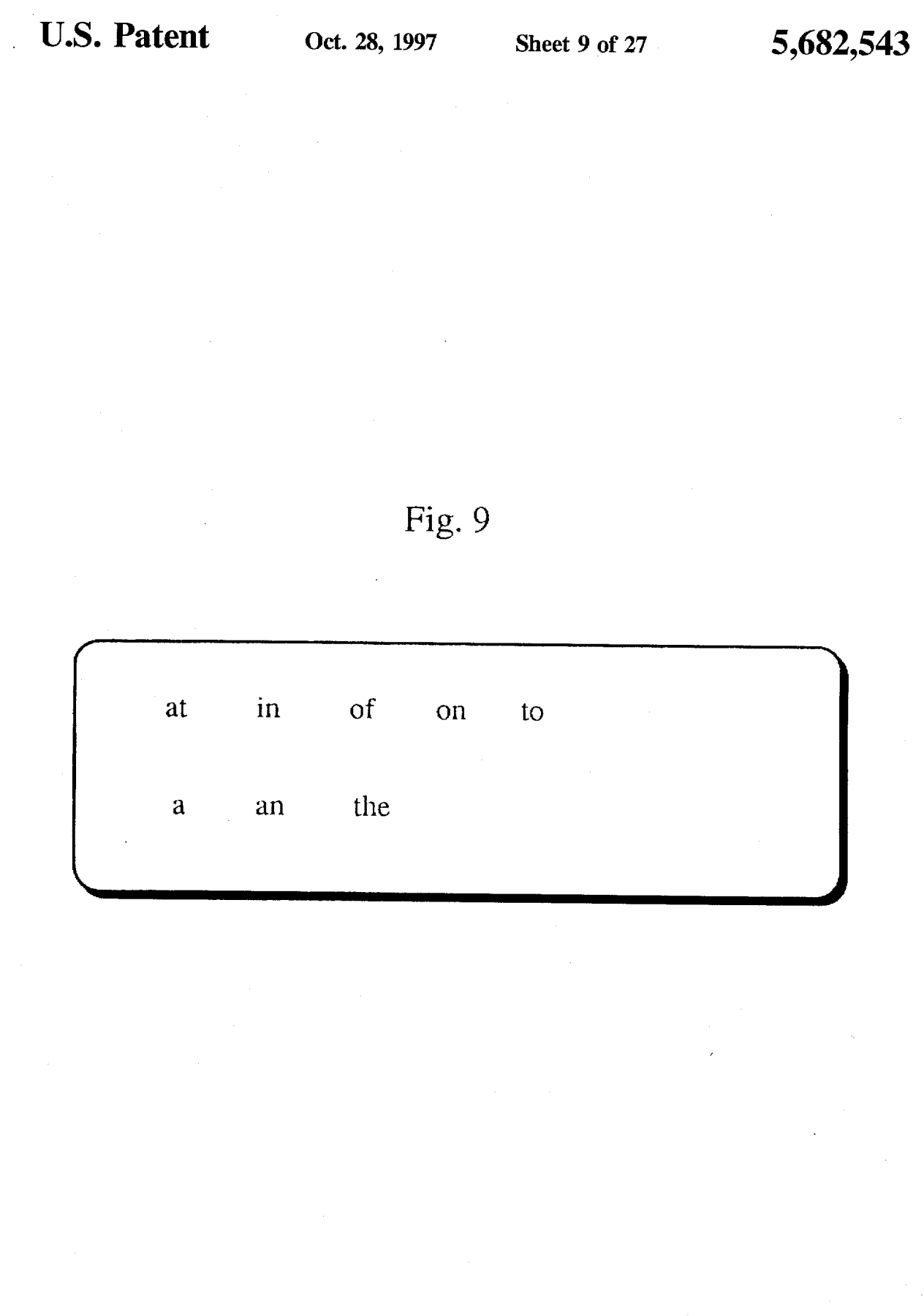

Moreover, not only prepositions and articles as shown in FIG. 9 but also nouns and pronouns can be stored.

The additional storage prohibition dictionary data deletion unit 409, which is started by the word division retrieval unit 405, successively reads the headwords sorted in the second temporary storage unit 407, judges whether the same headword is stored in the additional storage prohibition dictionary data storage unit 408. When the same headword is detected, the additional storage prohibition dictionary data deletion unit 409 deletes the dictionary data to which the headword belongs, the dictionary data being stored in the second temporary storage unit 407.

When the second temporary storage unit 407 stores the dictionary data shown in FIG. 8, the headword "on" corresponds to the "on" stored in the additional storage prohibition dictionary data storage unit 408, so the additional storage prohibition dictionary data deletion unit 409 deletes the dictionary data 801. FIG. 10 shows the new dictionary data in the second temporary storage unit 407.

When the additional storage prohibition dictionary data deletion unit 409 ends all the above mentioned processing, it starts the display unit 410.

Started by the input unit 402, the display unit 410 reads and displays the dictionary data stored in the first temporarily storage unit 403.

Started by the additional storage prohibition dictionary data deletion unit 409, the display unit 410 reads and displays the dictionary data stored in the second temporarily storage unit 407. At this point, as shown in FIG. 11, the display unit 410 gives a number to each of the headwords so that the user can give the direction to select the dictionary data to the input unit 402, using the number.

The dictionary data selection unit 411 receives the direction to select the dictionary data to be registered in the dictionary 401, the direction being sent from the input unit 402. Then the dictionary data selection unit 411 deletes other dictionary data from the second temporary storage unit 407, and stores the dictionary data in the first temporary storage unit 403 in addition to the corresponding information of the each dictionary data in the second temporary storage unit 407. When the dictionary data selection unit 411 ends the above mentioned processing, it starts the second dictionary register unit 412. Concrete example follows next.

Figure 11:
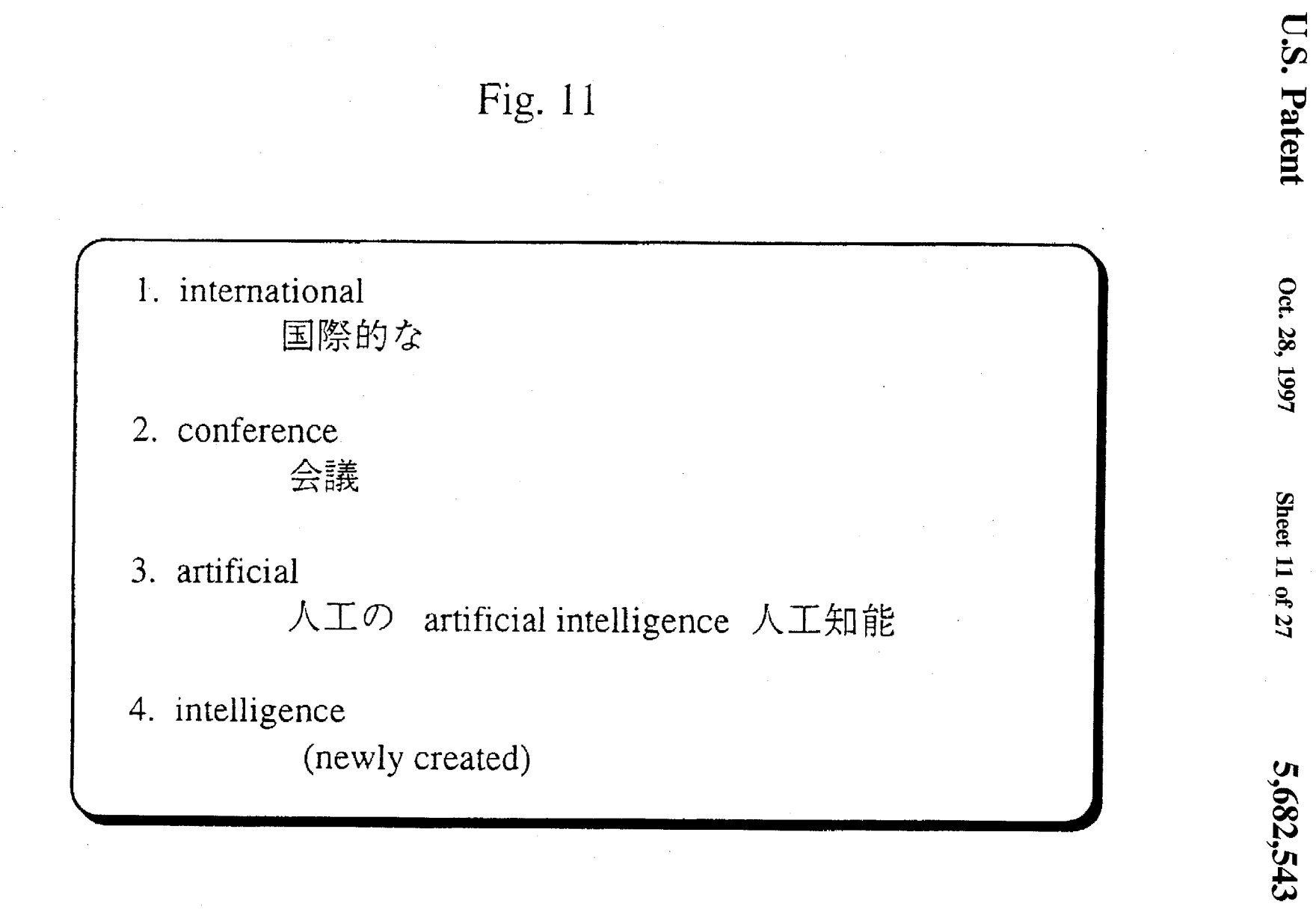
Figure 12:
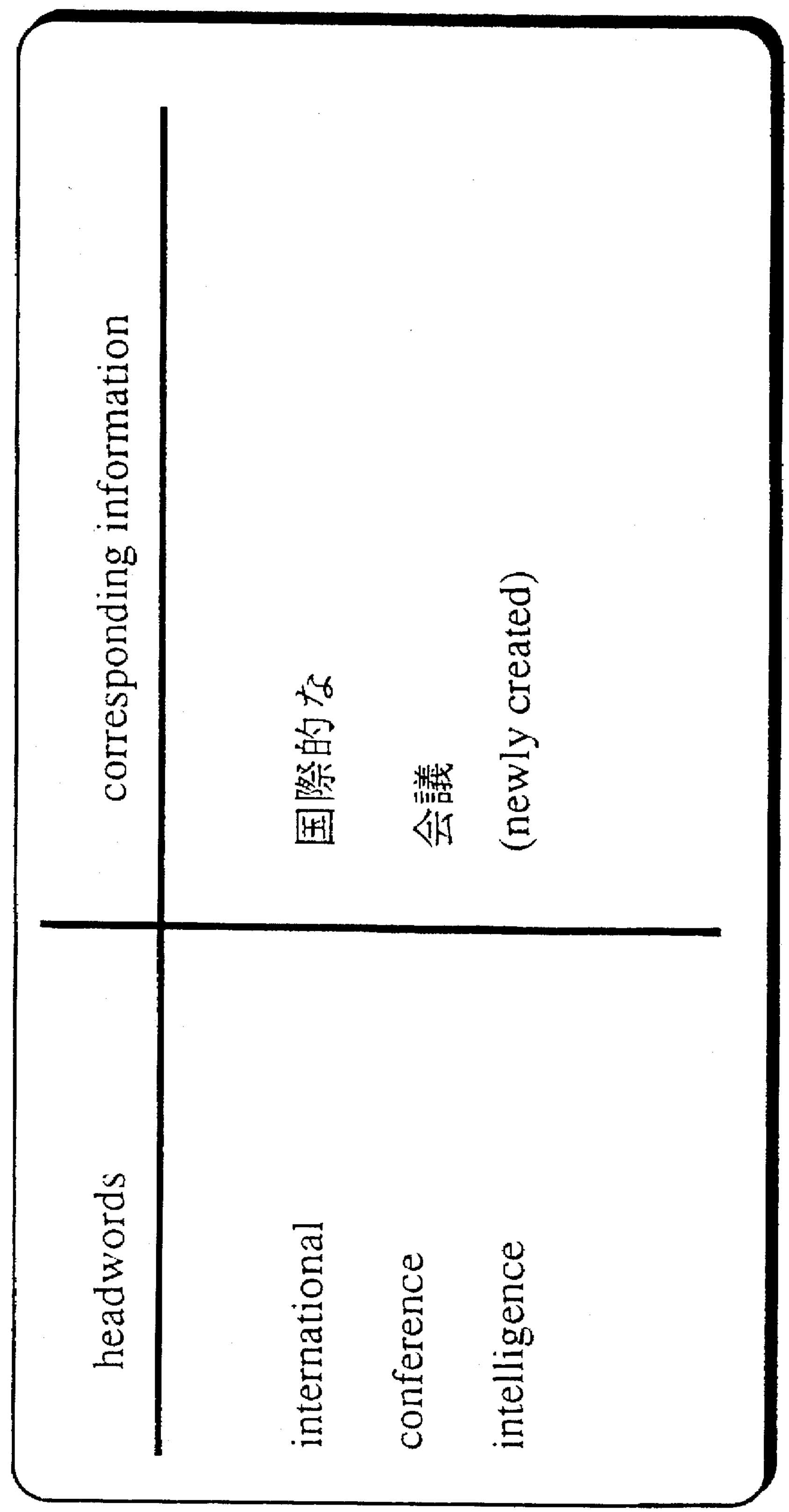
FIG. 12 shows dictionary data stored in the second temporary storage unit of Embodiment 1.

The dictionary data selection unit 411 receives "1", "2", and "4" when the dictionary data in the second temporary storage unit 407 is displayed by the display unit 410 as shown in FIG. 11. Then, the dictionary data selection unit 411 deletes the dictionary data of "3" from the second temporary storage unit 407, the dictionary data including the headword "artificial" and the corresponding information "人工の artificial intelligence 人工知能". FIG. 12 shows the new dictionary data in the second temporary storage unit 407.

Then, the dictionary data selection unit 411 stores the dictionary data "International Conference on Artificial Intelligence 人工知能に関する国際会議", which is stored in the first temporary storage unit 403, in addition to the corresponding information of the "international", "conference", and "intelligence". FIG. 13 shows the new dictionary in the second temporary storage unit 407.

The second dictionary register unit 412, which is started by the dictionary data selection unit 411, reads the headwords successively, the headwords being stored in the second temporary storage unit 407. When the same headword is detected in the dictionary 401, the second dictionary register unit 412 changes its corresponding information in the dictionary 401 to the corresponding information stored in the second temporary storage unit 407. When the same headword is not detected in the dictionary 401, the second dictionary register unit 412 registers new dictionary data which includes the headword.

As explained above, the second dictionary register unit 412 successively reads the headword, "international", "conference", and "intelligence", when the dictionary data shown in FIG. 13 are stored in the second temporary storage unit 407. As for "international" and "conference", the same headword is stored in the dictionary 401. The second dictionary register unit 412 changes the corresponding information of "international" and "conference" in the dictionary 401 to "国際的な International Conference on Artificial Intelligence 人工知能に関する国際会議" and "会議 International Conference on Artificial Intelligence 人工知能に関する国際会議", which are stored in the second temporary storage unit 407. "Intelligence" is not stored in the dictionary 401, so the second dictionary register unit 412 stores the new dictionary data in the dictionary 401, the dictionary data including "intelligence". Then the dictionary data in the dictionary 401 in FIG. 7 changes to the dictionary data in FIG. 14.

Moreover, in the present embodiment, the display unit 410 displays all the dictionary data stored in the second temporary storage unit 407, but only the headword can be displayed. It is not necessary to give number to each of the headwords. Alphabets can be used as reference characters instead of numbers.

Also in the present embodiment, the dictionary data selection unit 411 stores the dictionary data stored in the first temporary storage unit 403 in addition to the corresponding information in the second temporary storage unit 407. But it is possible to store only the headword as "reference". FIG. 15 shows an example of this.

It is also possible to provide the additional storage prohibition dictionary data storage unit 408, which adds and deletes the headword which does not need changing the corresponding information, with the additional storage prohibition dictionary data input unit, so that the dictionary data in the additional storage prohibition dictionary data storage unit 408 can be changed. At this point, the display unit 410 displays and easily changes the dictionary data in the additional storage prohibition dictionary data storage unit 408.

Moreover, the first dictionary register unit 404 stores a pointer in the first temporary storage unit 403, the pointer containing the address of the dictionary data when the dictionary data in the first temporary storage unit 403 is registered in the dictionary 401. Instead of the dictionary data stored in the first temporary storage unit 403, the dictionary data selection unit 411 can store the pointer in the second temporary storage unit 407. When the second dictionary register unit 412 registers dictionary data in the dictionary 401, the pointer can be registered as the corresponding information, instead of the dictionary data. Then the storage capacity of the dictionary 401 can be compacted.

Figure 16:
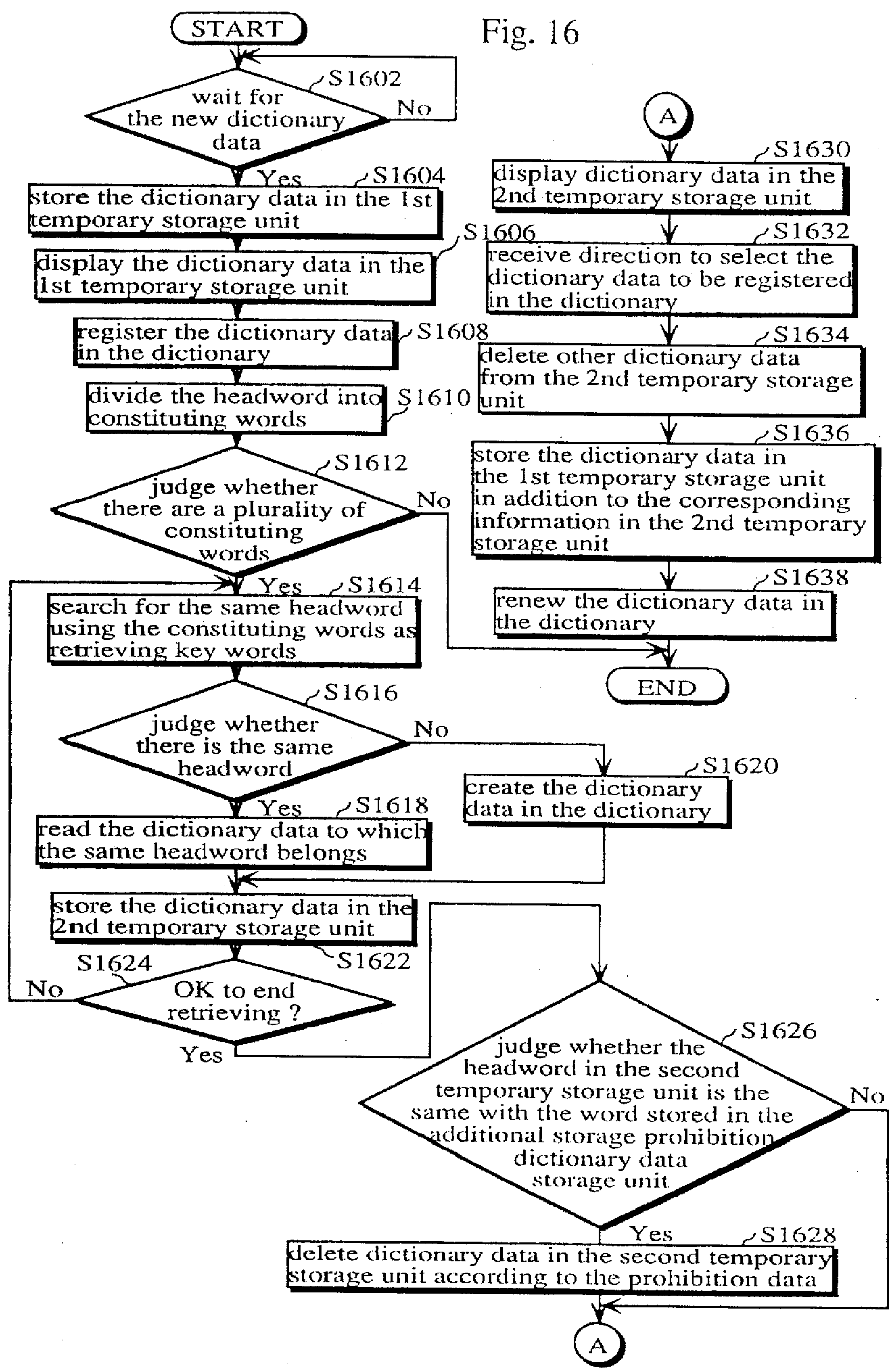
FIG. 16 is a flow chart which shows operations of the dictionary data register process of Embodiment 1.

Next, explanation of the operation of the present embodiment is given by means of a flow chart in FIG. 16.

(Step 1602) The input unit 402 waits for the input of the new dictionary data to be registered, (Step 1604) and stores the dictionary data in the first temporary storage unit 403.

(Step 1606) The display unit 410 displays the dictionary data in the first temporary storage unit 403.

(Step 1608) The first dictionary register unit 404 registers the dictionary data in the dictionary 401.

(Step 1610) The word division retrieval unit 405 divides the headword stored in the first temporary storage unit 403 into constituting words, (Step 1612) judges whether there are a plurality of constituting words, (Step 1614) ends processing when there is only one constituting word, and searches for the same headword in the dictionary 401 using the constituting words as retrieving key words when there are a plurality of constituting words.

(Step 1616) The word division retrieval unit 405 judges whether there is the same headword in the dictionary 401.

(Step 1618) When the same headword is detected, the word division retrieval unit 405 reads the dictionary data to which the same headword belongs, (Step 1622) and stores the dictionary data in the second temporary storage unit 407, (Step 1620) When the same headword is not detected, the word division retrieval unit 405 sends the retrieving key words to the dictionary data creation unit 406. The dictionary data creation unit 406 creates dictionary data and stores the newly created dictionary data in the second temporary storage unit 407, the newly created dictionary data including the received key word as the headword and with no corresponding information.

(Step 1626) Step 1614 is repeated until searching for the same headwords in the dictionary 401 for all the headwords stored in the first temporary storage unit 403 is finished. When the search is finished, the additional storage prohibition data deletion unit 409 judges whether the headword in the second temporary storage unit 407 is the same with the word stored in the additional storage prohibition dictionary data storage unit 408, (Step 1628) and, when the unit 409 judges they are the same, it deletes the dictionary data to which the headword belongs from the second temporary storage unit 407.

(Step 1630) The display unit 410 displays the dictionary data stored in the second temporary storage unit 407.

(Step 1632) The dictionary data selection unit 411 receives, from the input unit 402, the direction to select the dictionary data to be registered in the dictionary 401, (Step 1634) deletes other dictionary data from the second temporary storage unit 407, (Step 1636) reads the dictionary data stored in the first temporary storage unit 403, and stores it in addition to the corresponding information of each headword in the second temporary storage unit 407.

(Step 1638) The second dictionary register unit 412 renews the dictionary data in the dictionary 401 according to the dictionary data stored in the second temporary storage unit 407 and ends processing.

(Embodiment 2)

Figure 17:
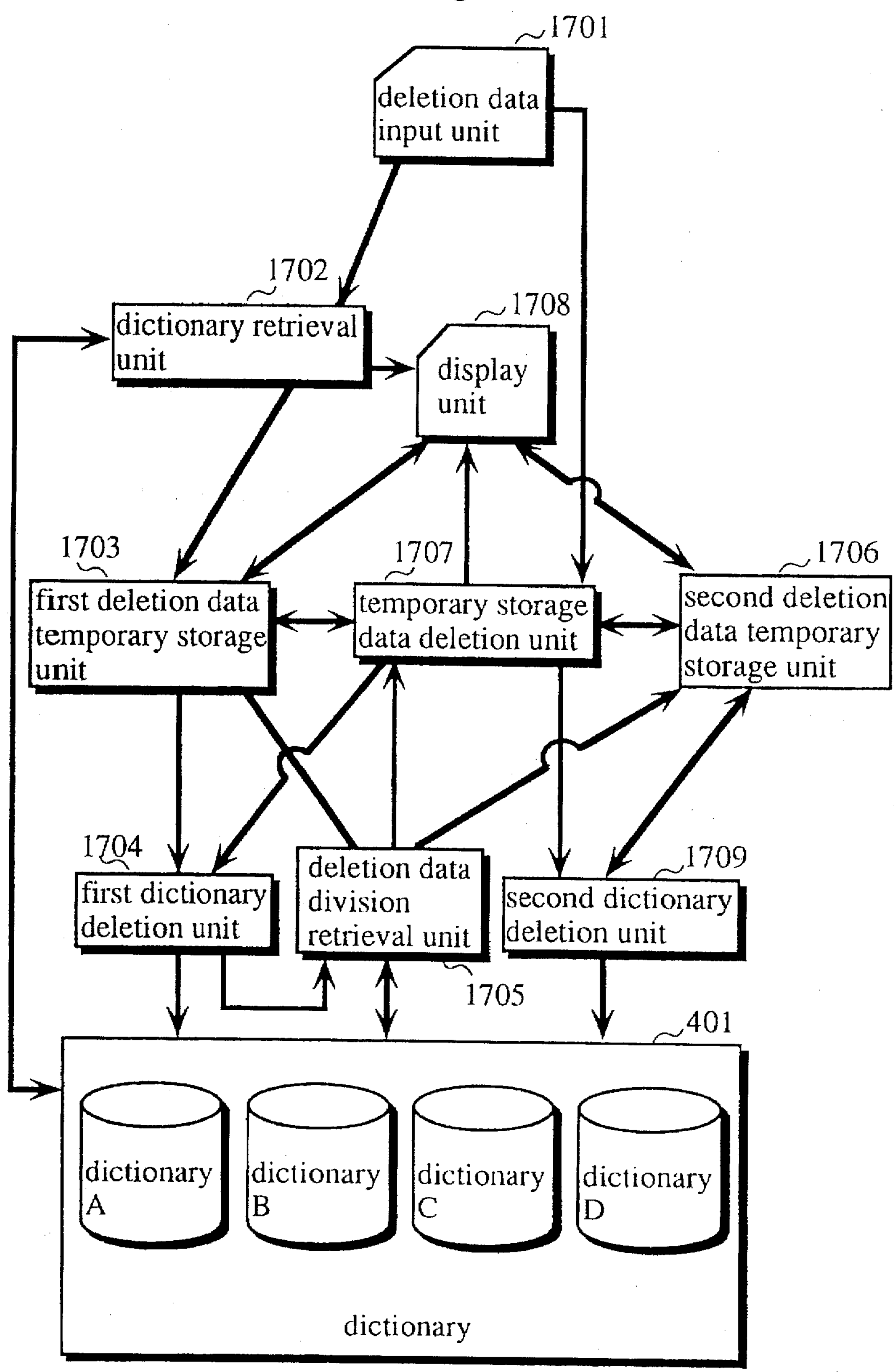
FIG. 17 is a block diagram of the dictionary editing apparatus according to Embodiment 2 of the present invention.

FIG. 17 shows construction of Embodiment 2 of the dictionary editing apparatus according to the present invention.

The dictionary editing apparatus comprises a dictionary 401, a deletion data input unit 1701 having a key board and the like, a dictionary retrieval unit 1702, a first deletion data temporary storage unit 1703 having a memory and the like, a first dictionary deletion unit 1704, a deletion data division retrieval unit 1705, a second deletion data temporary storage unit 1706 having a memory and the like, a temporary storage data deletion unit 1707, a display unit 1708 having a printer, CRT and the like, and a second dictionary deletion unit 1709.

The dictionary 401 is the same dictionary that is used in Embodiment 1, so explanation is omitted. FIG. 18 shows an example of dictionary data stored in the dictionary 401. Dictionary data including headwords 1801 and the corresponding information 1802 are registered.

The deletion data input unit 1701 receives input of the headword and a direction .to delete which of the dictionary data, the headword being inputted by the user in order to delete the dictionary data registered in the dictionary 401 and the direction being sent from the user who saw dictionary data in the first deletion data temporary storage unit 1703 displayed by the display unit 1708. Moreover, from the user who saw dictionary data in the second deletion data temporary storage unit 1706 displayed by the display unit 1708, the deletion data input unit 1701 receives numbers given to the headword, the numbers which show which of the dictionary data should be deleted.

Receiving the input of the headword, the deletion data input unit 1701 sends it to the dictionary retrieval unit 1702. Receiving the direction to delete which of the dictionary data, this unit 1701 sends the direction to the temporary storage data deletion unit 1707. Receiving the number given to the headword, the number showing which of the dictionary data should be deleted, this unit 1701 sends the headword to the temporary storage data deletion unit 1707.

Receiving the headword from the deletion data input unit 1701, the dictionary retrieval unit 1702 searches for the same headword in the dictionary 401, reads the dictionary data to which the same headword belongs, stores the dictionary data in the first deletion data temporary storage unit 1703, and starts the display unit 1708.

For example, after receiving the headword "International Conference on Artificial Intelligence" from the deletion data input unit 1701, the dictionary retrieval unit 1702 reads the dictionary data 1803 from the dictionary 401 and stores it in the first deletion data temporary storage unit 1703.

The first deletion data temporary storage unit 1703 temporarily stores the dictionary data read by the dictionary retrieval unit 1702. The dictionary data is deleted by the temporary storage data deletion unit 1707 according to the direction from the deletion data input unit 1701, the direction to delete which of the dictionary data.

Figure 19:
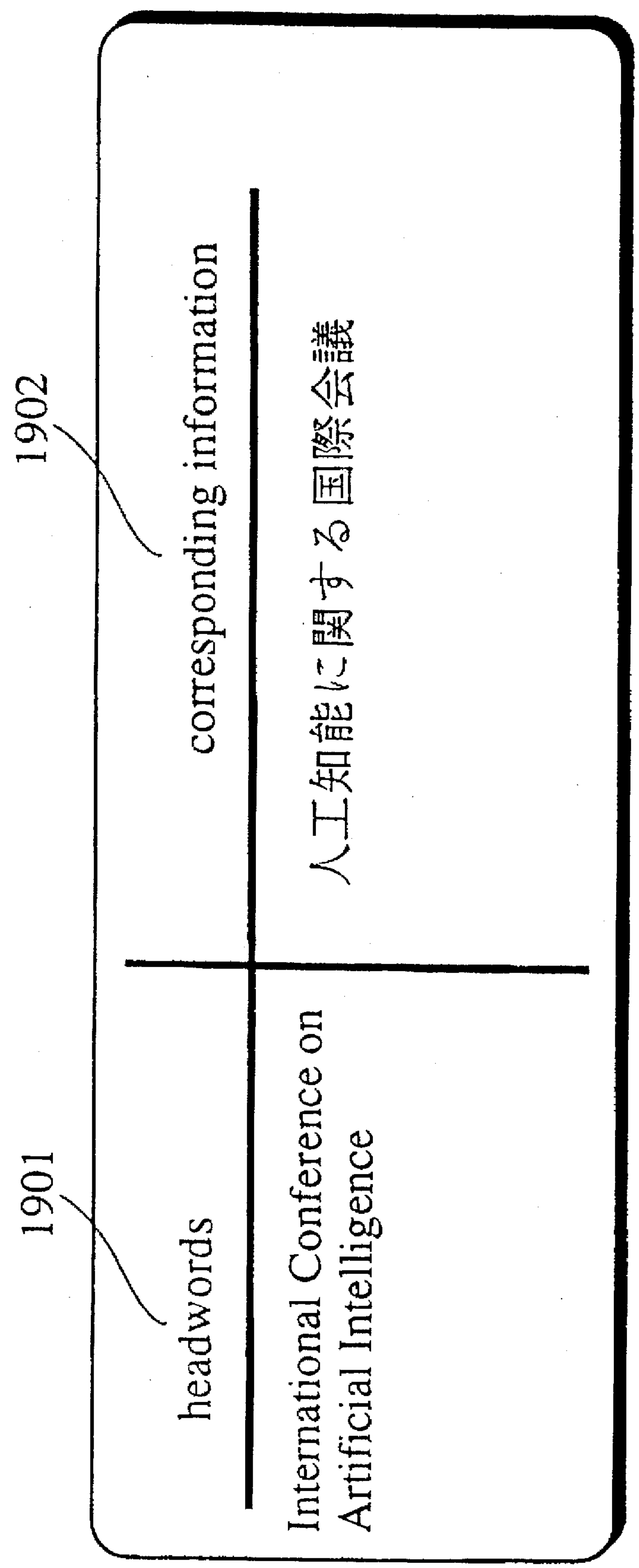
FIG. 19 shows dictionary data stored in a first deletion data temporary storage unit of Embodiment 2.
Figure 20:
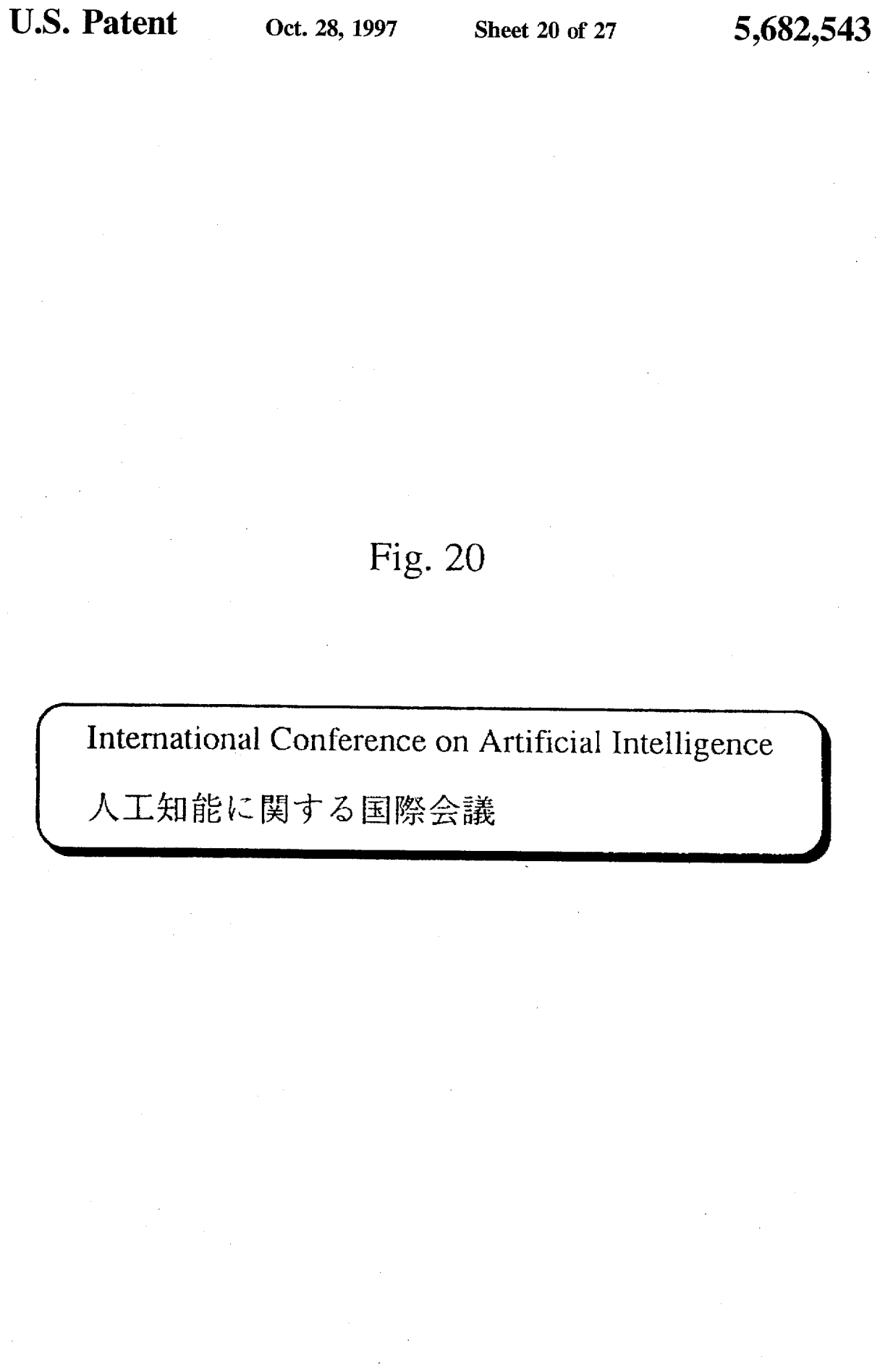

For example, when the dictionary retrieval unit 1702 reads the dictionary data 1803, the first deletion data temporary storage unit 1703 stores dictionary data including the headword 1901 and the corresponding information 1902, which is shown in FIG. 19. The dictionary data is displayed by the display unit 1708 as shown in FIG. 20.

The first dictionary deletion unit 1704, which is started by the temporary storage data deletion unit 1707, reads the dictionary data stored in the first deletion data temporary storage unit 1703, searches for the same headword in the dictionary 401, deletes the dictionary data to which the same headword belongs, and lastly, starts the deletion data division retrieval unit 1705.

For example, when the first deletion data temporary storage unit 1703 stores the dictionary data shown in FIG. 19, the dictionary data 1803 in the dictionary 401, which is shown in FIG. 18, is deleted. FIG. 21 shows the new dictionary data in the dictionary 401.

The deletion data division retrieval unit 1705, which is started by the first dictionary deletion unit 1704, reads the headword stored in the first deletion data temporary storage unit 1703 and divides them into constituting words. The deletion data division retrieval unit 1705 operates in the same way as the word division retrieval unit 405 in Embodiment 1.

When there are a plurality of constituting words, the deletion data division retrieval unit 1705 searches for the same headword in the dictionary 401, using the constituting words from the top as the retrieving key words, reads the dictionary data to which the same headword belongs, stores it in the second deletion data temporary storage unit 1706, and lastly, starts the temporary storage data deletion unit 1707.

The second deletion data temporary storage unit 1706 stores the dictionary data which was read from the dictionary 401 by the deletion data division retrieval unit 1705.

Figure 22:
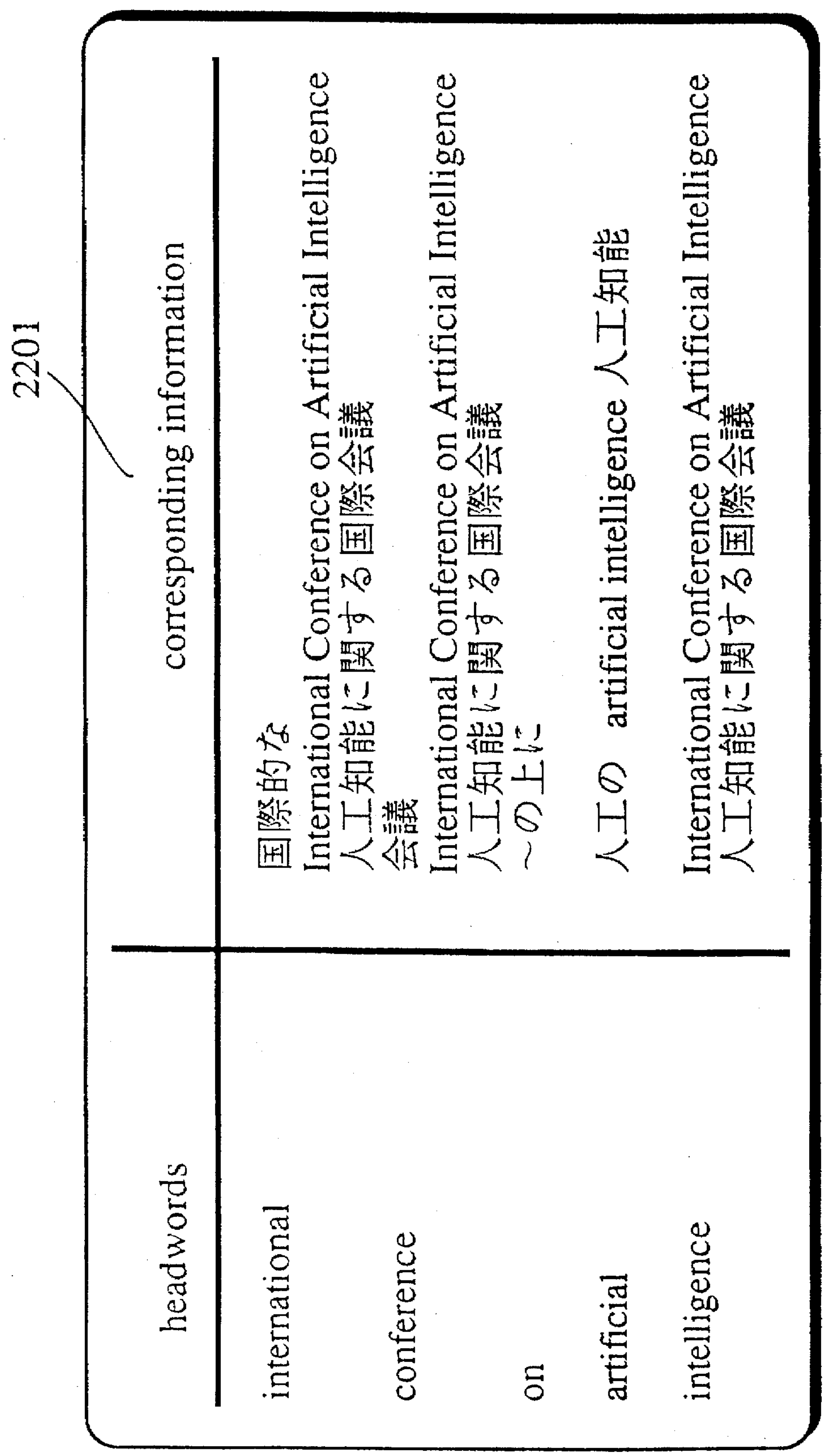
FIG. 22 shows dictionary data stored in a second deletion data temporary storage unit of Embodiment 2.

That is, when the first deletion data temporary storage unit 1703 stores the dictionary data shown in FIG. 19, the second deletion data division retrieval unit 1705 stores the dictionary data shown in FIG. 22.

Moreover, the dictionary data stored in the second deletion data temporary storage unit 1706 is changed by the temporary storage data deletion unit 1707.

Receiving the direction to delete which of the dictionary data from the deletion data input unit 1701, the temporary storage data deletion unit 1707 deletes other data from the first deletion data temporary storage unit 1703, and starts the first dictionary deletion unit 1704.

Moreover, in the present embodiment, the dictionary data shown by the display unit 1708 is "International Conference on Artificial Intelligence 人工知能に関する国際会議" only, as shown in FIG. 20. So when this dictionary data is selected for deletion, no dictionary data is deleted from the first deletion data temporary storage unit 1703.

The temporary storage data deletion unit 1707, which is started by the deletion data division retrieval unit 1705, reads the dictionary data stored in the first deletion data temporary storage unit 1703, searches for the dictionary data which includes the same dictionary data as the corresponding information 2201 in the second deletion data temporary storage unit 1706, deletes other dictionary data from the second deletion data temporary storage unit 1706, and lastly, starts the display unit 1708. Concrete example follows next.

The dictionary data shown in FIG. 19 is stored in the first deletion data temporary storage unit 1703 and the dictionary data shown in FIG. 22 is stored in the second deletion data temporary storage unit 1706. Then, the temporary storage data deletion unit 1707 deletes dictionary data from the second deletion data temporary storage unit 1706, the dictionary data not including the headwords "international", "conference", and "intelligence", each of which having the dictionary data "International Conference on Artificial Intelligence "人工知能に関する国際会議" as a part of the corresponding information 2201. FIG. 23 shows the new dictionary data in the second deletion data temporary storage unit 1706.

Moreover, after receiving the number given to the headword from the deletion data input unit 1701, the temporary storage data deletion unit 1707 deletes the dictionary data of other numbers from the second deletion data temporary storage unit 1706, reads the dictionary data stored in the second deletion data temporary storage unit 1703, and deletes the same part stored in the second deletion data temporary storage unit 1706 as the corresponding information, and lastly, starts the second dictionary deletion unit 1709. Concrete example follows next.

When the second deletion data temporary storage unit 1706 stores dictionary data shown in FIG. 23, the display unit 1708 displays the dictionary data shown in FIG. 24. Receiving number "1" from the deletion data input unit 1701, the temporary storage data deletion unit 1707 deletes the dictionary data of other numbers from the second deletion data tempera storage unit 1706, the dictionary data being "conference 会議 International Conference on Artificial Intelligence 人工知能に関する国際会議" and "intelligence International Conference on Artificial Intelligence 人工知能に関する国際会議". Then the display unit 1708 displays the new dictionary data shown in FIG. 25.

Moreover, the temporary storage data deletion unit 1707 reads the dictionary data "International Conference on Artificial Intelligence 人工知能に関する国際会議" stored in the first deletion data temporary storage unit 1703, and deletes the same part stored in the second deletion data temporary storage unit 1706 as the corresponding information. Then, the dictionary data in the second deletion data temporary storage unit 1706 includes the headword "international" and the corresponding information "国際的な".

Started by the dictionary retrieval unit 1702, the display unit 1708 reads the dictionary data stored in the first deletion data temporary storage unit 1703, and displays it as shown in FIG. 20.

Figure 25:
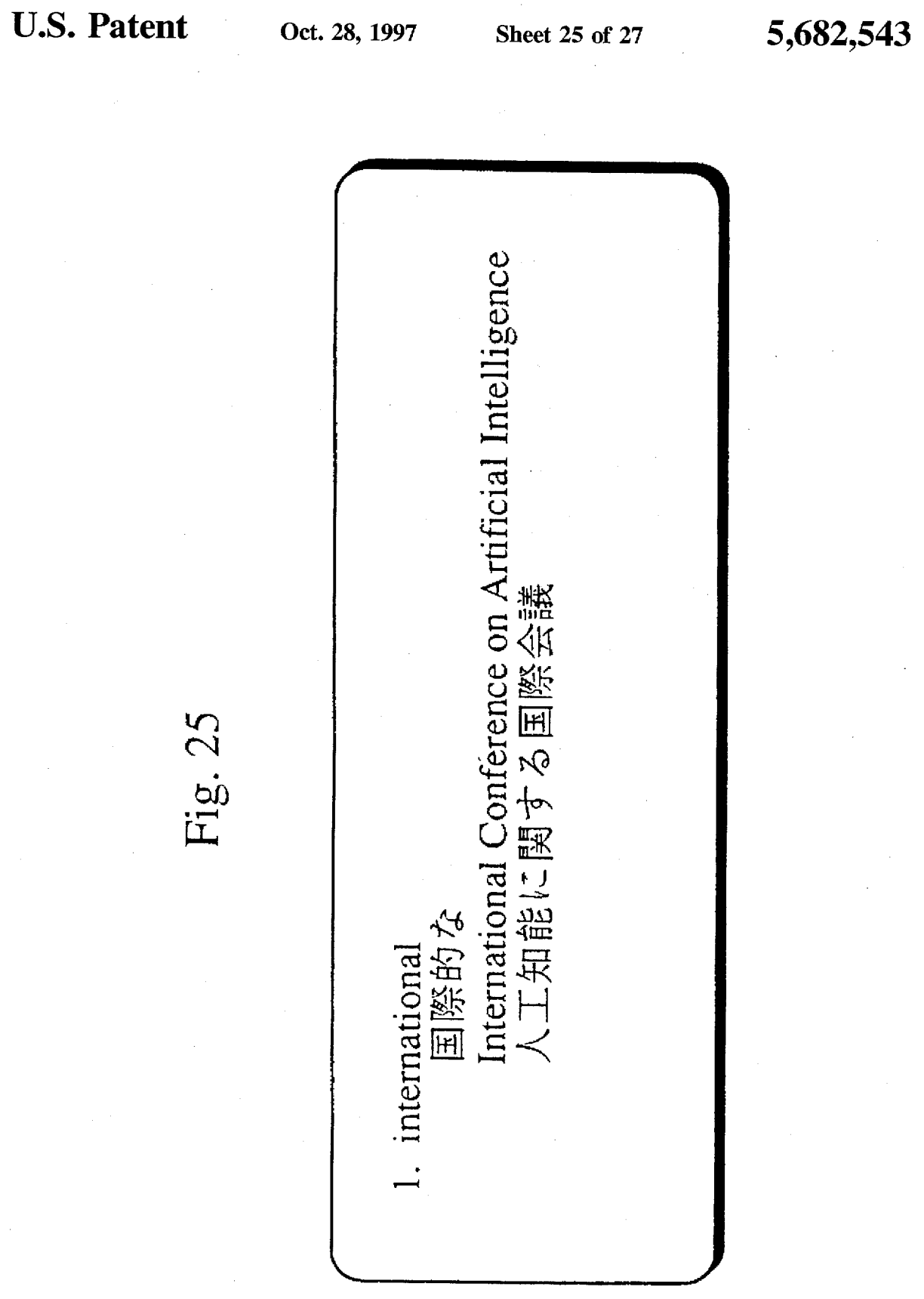

Started by the temporary storage data deletion unit 1707, the display unit 1708 reads the dictionary data in the second deletion data temporary storage unit 1706, gives numbers to the headwords, and displays the dictionary data as shown in FIG. 24. By using the numbers, the user can select the dictionary data to be deleted from the dictionary 401. Receiving the number from the deletion data input unit 1701 after the display of the dictionary data as shown in FIG. 24, the temporary storage data deletion unit 1707 reads the dictionary data of that number and displays it as shown in FIG. 25.

The second dictionary deletion unit 1709, which is started by the temporary storage data deletion unit 1707, reads the headword of the dictionary data stored in the second deletion data temporary storage unit 1706, detects the same headword in the dictionary 401, replaces the corresponding information of the same headword with the corresponding information stored in the second deletion data temporary storage unit 106. Concrete example follows next.

The headword "international" is stored in the second deletion data temporary storage unit 1706. Then the second dictionary deletion unit 1709 replaces the corresponding information "国際的な International Conference on Artificial Intelligence 人工知能に関する国際会議" in the dictionary 401 which is the corresponding information of the headword "international", with the corresponding information "国際的な" in the second deletion data temporary storage unit 1706. FIG. 26 shows the new dictionary data in the dictionary 401.

Figure 27:
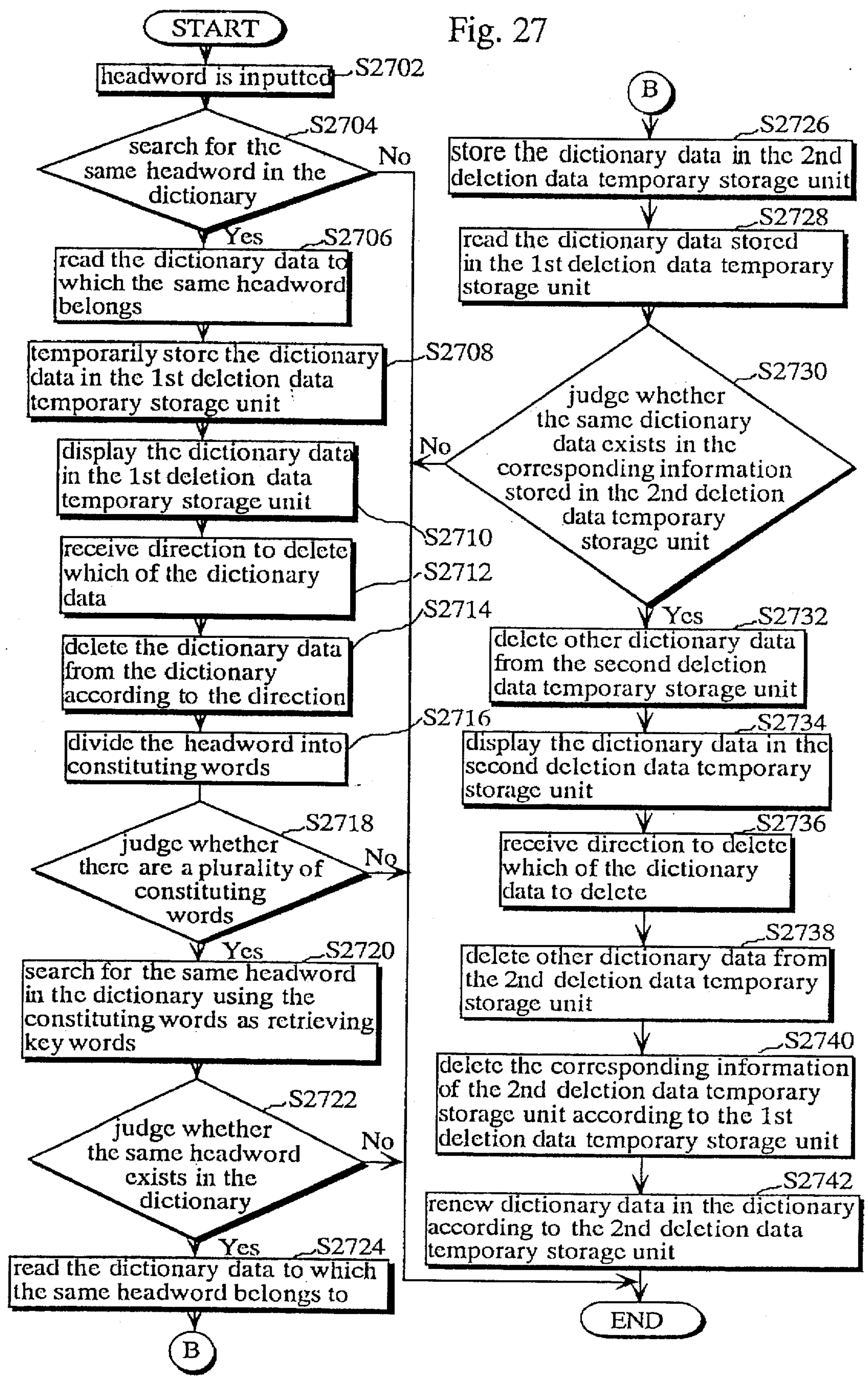
FIG. 27 is a flow chart which shows operations of the dictionary data deletion process of Embodiment 2.

Next, the flow chart in the FIG. 27 explains the operation of the present embodiment.

(Step 2702) The deletion data input unit 1701 receives input of headword by the user in order to delete the dictionary data registered in the dictionary 401.

(Step 2704) The dictionary deletion unit 1702 receives the headword from the deletion data input unit 1701, and searches for the same headword in the dictionary 401.

(Step 2706) When the same headword is not detected; the deletion data input unit 1702 ends processing. When the same headword is detected, this unit 1702 reads the dictionary data to which the headword belongs, and (Step 2708) stores it in the first deletion data temporary storage unit 1703.

(Step 2710) The display unit 1708 displays the dictionary data in the first deletion data temporary storage unit 1703.

(Step 2712) The deletion data input unit 1701 receives a direction (or confirmation) to delete which of the dictionary data from the user who saw the display.

(Step 2714) After the temporary storage data deletion unit 1707 deletes the dictionary data, which are not directed to be deleted from the deletion data input unit 1701, from the first deletion data temporary storage unit 1703, the first dictionary deletion unit 1704 deletes the dictionary data from the dictionary 401 according to the direction.

(Step 2716) The deletion data division retrieval unit 1705 reads the headword stored in the first deletion data temporary storage unit 1703, divides them into constituting words, (Step 2718) and judges whether there are a plurality of constituting words.

(Step 2720) When there is only one constituting word, the deletion data division retrieval unit 1705 ends processing. When there are a plurality of constituting words, this unit 1705 searches for the same headword in the dictionary 401, using the constituting words as the retrieval key words.

(Step 2724) When the same headword is not detected, the deletion data division retrieval unit 1705 ends processing. When the same headword is detected, this unit 1705 reads the dictionary data to which the same headword belongs, and (Step 2726) stores that dictionary data in the second deletion data temporary storage unit 1706.

(Step 2728) The temporary storage data deletion unit 1707 reads the dictionary data stored in the first deletion data temporary storage unit 1703, and (Step 2730) judges whether the same dictionary data exists in the corresponding information stored in the second deletion data temporary storage unit 1706.

(Step 2732) When the same dictionary data does not exist, the temporary storage data deletion unit 1707 ends processing. When the same dictionary data exists, this unit 1707 deletes other dictionary data, which do not include the same dictionary data, from the second deletion data temporary storage unit 1706.

(Step 2734) The display unit 1708 displays the dictionary data in the second deletion data temporary storage unit.

(Step 2736) The deletion data input unit 1701 receives direction to delete which of the dictionary data from the user who saw the display.

(Step 2738) The temporary storage data deletion unit 1707 deletes other dictionary data from the second deletion data temporary storage unit 1706, (Step 2740) reads the dictionary data stored in the first deletion data temporary storage unit 1703, and deletes the same part stored in the second deletion data temporary storage unit 1706 as the corresponding information.

(Step 2742) The second dictionary deletion unit 1709 renews the dictionary data in the dictionary 401 according to the second dictionary data temporary storage unit 1706, and then ends processing.

In each of the present embodiment, an English-Japanese dictionary is used as the dictionary 401. But other dictionaries can be used such as a Japanese-English dictionary, a Japanese-Japanese dictionary, a French-Japanese dictionary and the like.

Also, Embodiment 3, which will be the combination of the first embodiment and the second embodiment, can be made.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A dictionary editing apparatus comprising:

a dictionary having registered dictionary data, each of the dictionary data including a headword and corresponding information;

dictionary data input operation means for receiving input of new dictionary data to be registered in the dictionary;

dictionary data register means for registering the dictionary data in the dictionary, the dictionary data being received by the dictionary data input operation means;

headword division means for dividing the headword of the dictionary data into constituting words, the dictionary data being inputted from the dictionary data input operation means; and additional register means for additionally registering dictionary data in the dictionary, the dictionary data including a desired constituting word divided by the headword division means as a headword and the dictionary data received by the dictionary dam input operation means as corresponding information, the additional register means including:

a constituting word retrieval unit for searching for the same headword in the dictionary, using the constituting words divided by the headword division means as retrieving key words; and a headword creation unit for creating new dictionary data, when the constituting word retrieval unit cannot detect the same headword in the dictionary using the constituting word as the retrieving key word, the new dictionary data including the constituting word as a headword and information showing that the dictionary data is newly created as corresponding information.

2. The dictionary editing apparatus of claim 1, further includes:

dictionary data temporary storage means for temporarily storing the dictionary data to which the same headword detected by the constituting word retrieval unit belongs, and the new dictionary data which is created by the headword creation unit when the constituting word retrieval unit cannot detect the same headword in the dictionary using the constituting word as the retrieving key word, the new dictionary data including the constituting word as a headword and information showing that the dictionary data is newly created as corresponding information;

additional storage prohibition dictionary data storage means having headwords about which adding new data as the corresponding information is prohibited; and first dictionary data deletion means for deleting, when the headword stored in the dictionary data temporary storage means and the headword stored in the additional storage prohibition dictionary data storage means are the same, the dictionary data and/or the new dictionary data to which the headword belongs to from the dictionary data temporary storage means.

3. The dictionary editing apparatus of claim 2, further includes:

additional storage prohibition dictionary data change means for one of adding and deleting at least one headword stored in the additional storage prohibition dictionary data storage means.

4. The dictionary editing apparatus of claim 3, further includes:

corresponding information addition means for additionally storing the dictionary data as a part of the corresponding information of the headword stored in the dictionary data temporary storage means, the dictionary data being received by the dictionary data input operation means.

5. The dictionary editing apparatus of claim 4, further includes:

display means for displaying the dictionary data temporarily stored in the dictionary data temporary storage means;

register selection operation means for receiving a direction to select the dictionary data to be registered in the dictionary, the dictionary data being displayed by the display means; and second dictionary data deletion means for deleting the dictionary data from the dictionary data temporary storage means, the dictionary data about which the register selection operation means did not receive the selection direction.

6. The dictionary editing apparatus of claim 5, wherein the additional register means further includes:

a headword matching judgement unit for judging whether the same headword as registered in the dictionary data temporary storage means is registered in the dictionary;

a corresponding information replacement unit for replacing the corresponding information in the dictionary data with the corresponding information stored in the dictionary data temporary storage means, when the headword matching judgement unit judges that same headword is registered; and a dictionary data additional register unit for additionally registering the dictionary data in the dictionary, the dictionary data being stored in the dictionary data temporary storage means, when the headword matching judgement unit judges that the same headword is not registered.

7. The dictionary editing apparatus of claim 6, further includes:

deletion data input operation means for receiving input of a headword of dictionary data to be deleted from the dictionary;

deletion data retrieval means for searching for the same headword in the dictionary, using the headword received by the deletion data input operation means as the retrieving key word;

first dictionary data deletion means for deleting dictionary data from the dictionary, the dictionary data to which the headword retrieved by the deletion data retrieval means belongs to;

deletion data word division means for dividing the headword into constituting words, the headword being retrieved by the deletion data retrieval means;

constituting word retrieval means for retrieving the same headword in the dictionary, using the constituting words divided by the deletion data word division means as retrieving key words;

deletion data selection means for receiving a direction to select the dictionary data retrieved by the constituting word retrieval means;

second dictionary data deletion means for deleing, from the dictionary, at least part of the desired corresponding information of the dictionary data about which the deletion data selection means received the selection direction;

wherein at least part of the desired corresponding information is the dictionary data deleted by the first dictionary data deletion means, and the display means displays the dictionary data retrieved by the constituting word retrieval means.

8. The dictionary editing apparatus of claim 7, further includes:

deletion data temporary storage means for temporary storing dictionary data to which the headword belongs to, the headword being retrieved by the constituting word retrieval means;

deletion data deletion means for deleting the dictionary data which does not include, in the corresponding information stored in the deletion data temporary storage means, the same part as the dictionary data deleted from the dictionary by the first dictionary data deletion means;

wherein the display means displays the dictionary data stored in the deletion data temporary storage means after the dictionary data is deleted by the deletion data deletion means;

wherein the deletion data selection means includes:

a selection unit for receiving a direction to select the dictionary data to be deleted from the dictionary, the dictionary data being displayed by the display means;

a temporary storage data deletion unit for deleting, from the deletion data temporary storage means, the dictionary data about which the selection unit did not receive the selection direction;

a usage deletion unit for deleting, from the corresponding information stored in the deletion data temporary storage means, the same part as the dictionary data deleted from the dictionary by the first dictionary data deletion means, after the dictionary data is deleted from the temporary storage data deletion unit;

wherein the second dictionary data deletion means includes:

the dictionary data replacement unit for replacing the corresponding information of the headword in the dictionary with the corresponding information stored in the deletion data temporary storage means, the headword being the same as the headword stored in the deletion data temporary storage means.

9. The dictionary editing apparatus of claim 8, wherein the first dictionary data deletion means includes:

a deletion dictionary data selection unit for receiving a direction to select one dictionary data from the dictionary data displayed by the display means; and a first dictionary data deletion unit for deleting the dictionary data from the dictionary, the dictionary data about which the deletion dictionary data selection unit received the selection direction;

wherein the display means displays, when the deletion data retrieval unit retrieves a plurality of the same headwords in the dictionary, all dictionary data to which the same headwords in the dictionary belong to.

10. The dictionary editing apparatus of claim 5, wherein the additional register means further includes:

a headword matching judging unit for judging whether the same headword as registered in the dictionary data temporary storage means is registered in the dictionary;

a corresponding information replacement unit for registering a pointer in the corresponding information of the dictionary, the pointer containing an address of the dictionary data additionally registered in the dictionary by the additional register means, when the headword matching judgement unit judges that the same headword is registered; and a dictionary data additional storage unit for additionally registering the dictionary data in the dictionary, the dictionary data being stored in the dictionary data temporary storage means, when the headword matching judgement unit judges that the same headword is not registered.

11. The dictionary editing apparatus of claim 4, wherein the additional register means further includes:

a headword matching judgement unit for judging whether the same headword as registered in the dictionary data temporary storage means is registered in the dictionary;

a corresponding information replacement unit for replacing the corresponding information in the dictionary data with the corresponding information stored in the dictionary data temporary storage means, when the headword matching judgement unit judges that same headword is registered; and a dictionary data additional register unit for additionally registering the dictionary data in the dictionary, the dictionary data being stored in the dictionary data temporary storage means, when the headword matching judgement unit judges that the same headword is not registered.

12. The dictionary editing apparatus of claim 4, wherein the additional register means further includes:

a headword matching judging unit for judging whether the same headword as registered in the dictionary data temporary storage means is registered in the dictionary;

a corresponding information replacement unit for registering a pointer in the corresponding information of the dictionary, the pointer containing an address of the dictionary data additionally registered in the dictionary by the additional register means, when the headword matching judgement unit judges that the same headword is registered; and a dictionary data additional storage unit for additionally registering the dictionary data in the dictionary, the dictionary data being stored in the dictionary data temporary storage means, when the headword matching judgement unit judges that the same headword is not registered.

13. The dictionary editing apparatus of claim 2, further includes:

corresponding information addition means for additionally storing the dictionary data as a part of the corresponding information of the headword stored in the dictionary data temporary storage means, the dictionary data being received by the dictionary data input operation means.

14. The dictionary editing apparatus of claim 13, further includes:

display means for displaying the dictionary data temporarily stored in the dictionary data temporary storage means;

register selection operation means for receiving a direction to select the dictionary data to be registered in the dictionary, the dictionary data being displayed by the display means; and second dictionary data deletion means for deleting the dictionary data from the dictionary data temporary storage means, the dictionary data about which the register selection operation means did not receive the selection direction.

15. The dictionary editing apparatus of claim 14, wherein the additional register means further includes:

a headword matching judgement unit for judging whether the same headword as registered in the dictionary data temporary storage means is registered in the dictionary;

a corresponding information replacement unit for replacing the corresponding information in the dictionary data with the corresponding information stored in the dictionary data temporary storage means, when the headword matching judgement unit judges that same headword is registered; and a dictionary data additional register unit for additionally registering the dictionary data in the dictionary, the dictionary data being stored in the dictionary data temporary storage means, when the headword matching judgement unit judges that the same headword is not registered.

16. The dictionary editing apparatus of claim 15, further includes:

deletion data input operation means for receiving input of a headword of dictionary data to be deleted from the dictionary;

deletion data retrieval means for searching for the same headword in the dictionary, using the headword received by the deletion data input operation means as the retrieving key word;

first dictionary data deletion means for deleting dictionary data from the dictionary, the dictionary data to which the headword retrieved by the deletion data retrieval means belongs to;

deletion data word division means for dividing the headword into constituting words, the headword being retrieved by the deletion data retrieval means;

constituting word retrieval means for retrieving the same headword in the dictionary, using the constituting words divided by the deletion data word division means as retrieving key words;

deletion data selection means for receiving a direction to select the dictionary data retrieved by the constituting word retrieval means;

second dictionary data deletion means for deleing, from the dictionary, at least part of the desired corresponding information of the dictionary data about which the deletion data selection means received the selection direction;

wherein at least part of the desired corresponding information is the dictionary data deleted by the first dictionary data deletion means, and the display means displays the dictionary data retrieved by the constituting word retrieval means.

17. The dictionary editing apparatus of claim 16, further includes:

deletion data temporary storage means for temporary storing dictionary data to which the headword belongs to, the headword being retrieved by the constituting word retrieval means;

deletion data deletion means for deleting the dictionary data which does not include, in the corresponding information stored in the deletion data temporary storage means, the same part as the dictionary data deleted from the dictionary by the first dictionary data deletion means;

wherein the display means displays the dictionary data stored in the deletion data temporary storage means after the dictionary data is deleted by the deletion data deletion means;

wherein the deletion data selection means includes:

a selection unit for receiving a direction to select the dictionary data to be deleted from the dictionary, the dictionary data being displayed by the display means;

a temporary storage data deletion unit for deleting, from the deletion data temporary storage means, the dictionary data about which the selection unit did not receive the selection direction;

a usage deletion unit for deleting, from the corresponding information stored in the deletion data temporary storage means, the same part as the dictionary data deleted from the dictionary by the first dictionary data deletion means, after the dictionary data is deleted from the temporary storage data deletion unit;

wherein the second dictionary data deletion means includes:

the dictionary data replacement unit for replacing the corresponding information of the headword in the dictionary with the corresponding information stored in the deletion data temporary storage means, the headword being the same as the headword stored in the deletion data temporary storage means.

18. The dictionary editing apparatus of claim 17, wherein the first dictionary data deletion means includes:

a deletion dictionary data selection unit for receiving a direction to select one dictionary data from the dictionary data displayed by the display means; and a first dictionary data deletion unit for deleting the dictionary data from the dictionary, the dictionary data about which the deletion dictionary data selection unit received the selection direction;

wherein the display means displays, when the deletion data retrieval unit retrieves a plurality of the same headwords in the dictionary, all dictionary data to which the same headwords in the dictionary belong to.

19. A dictionary editing data comprising:

a dictionary having dictionary data registered, each of the dictionary data including a headword and corresponding information;

deletion data input operation means for receiving input of a headword of the dictionary data to be deleted from the dictionary data registered in the dictionary;

deletion data retrieval means for retrieving the same headword in the dictionary, using the headword received by the deletion data input operation means as the retrieving key word;

first dictionary data deletion means for deleting dictionary data from the dictionary, the dictionary data to which the headword retrieved by the deletion data retrieval means belongs;

deletion data word division means for dividing the headword into constituting words, the headword being retrieved by the deletion data retrieval means;

constituting word retrieval means for retrieving the same headword in the dictionary, using the constituting words divided by the deletion data word division means as the retrieving key words;

display means for displaying the dictionary data retrieved by the constituting word retrieval means;

deletion data selection means for receiving a direction to select the dictionary data retrieved by the constituting word retrieval means;

second dictionary data deletion means for deleting, from the dictionary, at least part of the desired corresponding information of the dictionary data about which the deletion data selection means received the selection direction;

wherein at least part of the desired corresponding information is the dictionary data deleted by the first dictionary data deletion means.

20. The dictionary editing apparatus of claim 19, further includes:

deletion data temporary storage means for temporary storing dictionary data to which the headword belongs to, the headword being retrieved by the constituting word retrieval means;

deletion data deletion means for deleting the dictionary data which does not include, in the corresponding information stored in the deletion data temporary storage means, the same part as the dictionary data deleted from the dictionary by the first dictionary data deletion means;

wherein the display means displays the dictionary data stored in the deletion data temporary storage means after the dictionary data is deleted by the deletion data deletion means;

wherein the deletion data selection means includes:

a selection unit for receiving a direction to select the dictionary data to be deleted from the dictionary, the dictionary data being displayed by the display means;

a temporary storage data deletion unit for deleting, from the deletion data temporary storage means, the dictionary data about which the selection unit did not receive the selection direction;

a usage deletion unit for deleting, from the corresponding information stored in the deletion data temporary storage means, the same part as the dictionary data deleted from the dictionary by the first dictionary data deletion means, after the dictionary data is deleted from the temporary storage data deletion unit;

wherein the second dictionary data deletion means includes:

the dictionary data replacement unit for replacing the corresponding information of the headword in the dictionary with the corresponding information stored in the deletion data temporary storage means, the headword being the same as the headword stored in the deletion data temporary storage means.

21. The dictionary editing apparatus of claim 20, wherein the first dictionary data deletion means includes:

a deletion dictionary data selection unit for receiving a direction to select one dictionary data from the dictionary data displayed by the display means; and a first dictionary data deletion unit for deleting the dictionary data from the dictionary, the dictionary data about which the deletion dictionary data selection unit received the selection direction;

wherein the display means displays, when the deletion data retrieval unit retrieves a plurality of the same headwords in the dictionary, all dictionary data to which the same headwords in the dictionary belong to.

* * * * *